US007473838B2

(12) United States Patent
Suzuki et al.

(10) Patent No.: US 7,473,838 B2
(45) Date of Patent: Jan. 6, 2009

(54) SOUND IDENTIFICATION APPARATUS

(75) Inventors: Tetsu Suzuki, Osaka (JP); Yoshihisa Nakatoh, Nara (JP); Shinichi Yoshizawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 56 days.

(21) Appl. No.: 11/783,376

(22) Filed: Apr. 9, 2007

(65) Prior Publication Data

US 2007/0192099 A1 Aug. 16, 2007

Related U.S. Application Data

(63) Continuation of application No. PCT/JP2006/315463, filed on Aug. 4, 2006.

(30) Foreign Application Priority Data

Aug. 24, 2005 (JP) ............................. 2005-243325

(51) Int. Cl.
*G10H 1/00* (2006.01)
*G06F 17/00* (2006.01)

(52) U.S. Cl. ........................... 84/600; 84/601; 704/219; 704/240; 700/94

(58) Field of Classification Search ........... 84/600–602; 700/94; 704/219, 240
See application file for complete search history.

(56) References Cited

U.S. PATENT DOCUMENTS

| | | | | |
|---|---|---|---|---|
| 4,541,110 | A * | 9/1985 | Hopf et al. | 704/231 |
| 6,990,443 | B1 | 1/2006 | Abe et al. | |
| 7,328,153 | B2 * | 2/2008 | Wells et al. | 704/231 |
| 2003/0086341 | A1 * | 5/2003 | Wells et al. | 369/13.56 |
| 2005/0177362 | A1 | 8/2005 | Toguri | |
| 2007/0192099 | A1 * | 8/2007 | Suzuki et al. | 704/240 |
| 2007/0225981 | A1 * | 9/2007 | Kim | 704/240 |
| 2008/0052068 | A1 * | 2/2008 | Aguilar et al. | 704/230 |
| 2008/0126089 | A1 * | 5/2008 | Printz et al. | 704/235 |

FOREIGN PATENT DOCUMENTS

| | | |
|---|---|---|
| EP | 1 100 073 | 5/2001 |

(Continued)

*Primary Examiner*—David S. Warren
(74) *Attorney, Agent, or Firm*—Wenderoth, Lind & Ponack, L.L.P.

(57) ABSTRACT

A sound identification apparatus which reduces the chance of a drop in the identification rate, including: a frame sound feature extraction unit which extracts a sound feature per frame of an inputted audio signal; a frame likelihood calculation unit which calculates a frame likelihood of the sound feature in each frame, for each of a plurality of sound models; a confidence measure judgment unit which judges a confidence measure based on the frame likelihood; a cumulative likelihood output unit time determination unit which determines a cumulative likelihood output unit time based on the confidence measure; a cumulative likelihood calculation unit which calculates a cumulative likelihood in which the frame likelihoods of the frames included in the cumulative likelihood output unit time are cumulated, for each sound model; a sound type candidate judgment unit which determines, for each cumulative likelihood output unit time, a sound type corresponding to the sound model that has a maximum cumulative likelihood; a sound type frequency calculation unit which calculates the frequency of the sound type candidate; and a sound type interval determination unit which determines the sound type of the inputted audio signal and the interval of the sound type, based on the frequency of the sound type.

12 Claims, 21 Drawing Sheets

FOREIGN PATENT DOCUMENTS

| | | |
|---|---|---|
| EP | 1 600 943 | 11/2005 |
| JP | 6-35495 | 2/1994 |
| JP | 2001-142480 | 5/2001 |
| JP | 2004-271736 | 9/2004 |

* cited by examiner

FIG. 2

| | Tk[10ms] | Source Identification Rate | | |
|---|---|---|---|---|
| ↓Background Noise/ Identification Target Sound→ | | Sound M001 | Music M4 | Ambient Noise N13 |
| Ambient Noise N1···N17 | 100 | 89 | 46 | 79 |
| | 10 | 92 | 58 | 48 |
| | 1 | 95 | 66 | 3 |
| Music M1···M9 | 100 | 95 | 73 | 80 |
| | 10 | 96 | 71 | 55 |
| | 1 | 98 | 77 | 4 |
| Sound M001 | 100 | -- | 70 | 20 |
| | 10 | -- | 74 | 26 |
| | 1 | -- | 66 | 4 |

Learning Model 15dB/Evaluation Data 05dB (hatched box) Conditions improved more than Tk=100

(double-lined box) Best cumulative frequentness calculation unit time

SOUND IDENTIFICATION APPARATUS

CROSS REFERENCE TO RELATED APPLICATION

This is a continuation of PCT application No. PCT/JP2006/315463, filed Aug. 4, 2006, and designating the United States of America.

BACKGROUND OF THE INVENTION (1) Field of the Invention

The present invention relates to a sound identification apparatus which identifies an inputted sound, and outputs the type of the inputted sound and an interval of each type of inputted sound.

(2) Description of the Related Art

Conventionally, sound identification apparatuses have been widely used as means for extracting information regarding the source, emitting device, and so on of a certain sound by extracting acoustic characteristics of the sound. Such apparatuses are used, for example, for detecting the sound of ambulances, sirens, and so on occurring outside of a vehicle and providing a notification of such sounds to within the vehicle, for discovering defective devices by analyzing the sound a product manufactured in a factory emits during operation and detecting abnormalities in the sound, and so on. However, recent years have seen a demand for a technique for identifying the type, category, and so on of sounds from mixed ambient sounds in which various sounds are mixed together or sounds are emitted alternately, without limiting the sound to be identified to a specific sound.

Patent Reference 1 (Japanese Laid-Open Patent Application No. 2004-271736; paragraphs 0025 to 0035) can be given as an example of a technique for identifying the type, category, and so on of an emitted sound. The information detection device described in Patent Reference 1 divided inputted sound data into blocks based on predetermined units of time and classifies each block as sound "S" or music "M". FIG. 1 is a diagram that schematically shows the result of classifying sound data on the time axis. Next, the information detection device averages, per time t, the results of classification in a predetermined unit of time Len, and calculates an identification frequency Ps(t) or Pm(t), which indicate the probability that a sound type is "S" or "M". The predetermined unit of time Len in time t0 is schematically shown in FIG. 1. For example, in the case of calculating Ps(t0), the sum of the number of sound types "S" present in the predetermined unit of time Len is divided by the predetermined unit of time Len, resulting in the identification frequency Ps(t0). Then, Ps(t) or Pm(t) is compared with a predetermined threshold P0, and an interval of the sound "S" or the music "M" is detected based on whether or not Ps(t) or Pm(t) exceeds the threshold P0.

However, with Patent Reference 1, in the case of calculating the identification frequency of Ps(t) and the like in each time t, the same predetermined unit of time Len, or in other words, a predetermined unit of time Len which has a fixed value, is used, which gives rise to the following problems.

The first problem is that interval detection becomes inaccurate in the case where sudden sounds occur in rapid succession. When sudden sounds occur in rapid succession, the judgment of the sound type of the blocks becomes inaccurate, and differences between the actual sound type and the sound type judged for each block occur at a high rate. When such differences occur at a high rate, the identification frequency Ps and the like in the predetermined unit of time Len become inaccurate, which in turn causes the detection of the final sound or sound interval to become inaccurate as well.

The second problem is that the recognition rate of the sound to be identified (the target sound) is dependent on the length of the predetermined unit of time Len due to the relationship between the target sound and background sounds. In other words, in the case where the target sound is identified using the predetermined unit of time Len, which is a fixed value, there is a problem in that the recognition rate for the target sound drops due to background sounds. This problem shall be discussed in detail later.

Having been conceived in light of the aforementioned problems, an object of the present invention is to provide a sound identification apparatus which reduces the chance of a drop in the identification rate, even when sudden sounds occur, and furthermore, even when a combination of the target sound and background sounds changes.

SUMMARY OF THE INVENTION

The sound identification apparatus according to the present invention is a sound identification apparatus that identifies the sound type of an inputted audio signal, and includes: a sound feature extraction unit which divides the inputted audio signal into a plurality of frames and extracts a sound feature per frame; a frame likelihood calculation unit which calculates a frame likelihood of the sound feature in each frame, for each of a plurality of sound models; a confidence measure judgment unit which judges a confidence measure based on the sound feature or a value derived from the sound feature, the confidence measure being an indicator of whether or not to cumulate the frame likelihoods; a cumulative likelihood output unit time determination unit which determines a cumulative likelihood output unit time so that the cumulative likelihood output unit time is shorter in the case where the confidence measure is higher than a predetermined value and longer in the case where the confidence measure is lower than the predetermined value; a cumulative likelihood calculation unit which calculates a cumulative likelihood in which the frame likelihoods of the frames included in the cumulative likelihood output unit time are cumulated, for each of the plurality of sound models; a sound type candidate judgment unit which determines, for each cumulative likelihood output unit time, a sound type corresponding to the sound model that has a maximum cumulative likelihood; a sound type frequency calculation unit which calculates a frequency at which the sound type determined by the sound type candidate judgment unit appears in a predetermined identification time unit; and a sound type interval determination unit which determines the sound type of the inputted audio signal and the temporal interval of the sound type, based on the frequency of the sound type calculated by the sound type frequency calculation unit.

For example, the confidence measure judgment unit judges the confidence measure based on the frame likelihood of the sound feature in each frame for each sound model, calculated by the frame likelihood calculation unit.

Through such a configuration, the cumulative output unit time is determined based on a predetermined confidence measure, such as, for example, a frame confidence measure that is based on a frame likelihood. For this reason, it is possible, by making the cumulative likelihood output unit time shorter in the case where the confidence measure is high and longer in the case where the confidence measure is low, to make the frame number for judging the sound type variable. Accordingly, it is possible to reduce the influence of short amounts of time of sudden abnormal sounds with low confidence measures. In this manner, the cumulative likelihood output unit time is caused to change based on the confidence measure, and thus it is possible to provide a sound identification apparatus in which the chance of a drop in the identification rate is reduced even when a combination of background sounds and the sound to be identified changes.

Preferably, the frame likelihood for frames having a confidence measure lower than a predetermined threshold is not cumulated.

Through this configuration, frames with a low confidence measure are ignored. For this reason, it is possible to accurately identify the sound type.

Note that the confidence measure judgment unit may judge the confidence measure based on the cumulative likelihood calculated by the cumulative likelihood calculation unit.

In addition, the confidence measure judgment unit may judge the confidence measure based on the cumulative likelihood per sound model calculated by the cumulative likelihood calculation unit.

Furthermore, the confidence measure judgment unit may judge the confidence measure based on the sound feature extracted by the sound feature extraction unit.

It should be noted that the present invention can be realized not only as a sound identification apparatus that includes the abovementioned characteristic units, but may also be realized as a sound identification method which implements the characteristic units included in the sound identification apparatus as steps, a program which causes a computer to execute the characteristic steps included in the sound identification method, and so on. Furthermore, it goes without saying that such a program may be distributed via a storage medium such as a Compact Disc Read Only Memory (CD-ROM) or a communications network such as the Internet.

According to the sound identification apparatus of the present invention, it is possible to make the cumulative likelihood output unit time variable based on the confidence measure of a frame or the like. Therefore, it is possible to provide a sound identification apparatus which reduces the chance of a drop in the identification rate, even when sudden sounds occur, and furthermore, even when a combination of the target sound and background sounds changes.

FURTHER INFORMATION ABOUT TECHNICAL BACKGROUND TO THIS APPLICATION

The disclosure of Japanese Patent Application No. 2005-243325, filed on Aug. 24, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a chart showing sound identification performance results based on frequency, in the present invention;

DESCRIPTION OF THE PREFERRED EMBODIMENTS

Figure 1:
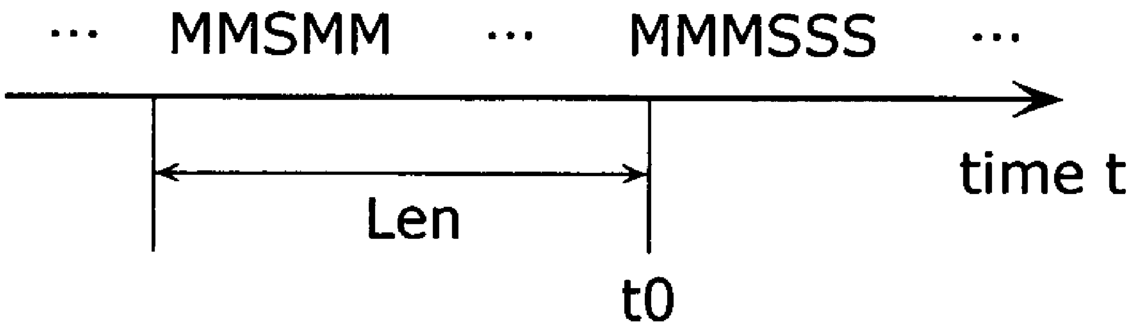
FIG. 1 is a schematic diagram of identification frequency information in Patent Reference 1.

Hereafter, embodiments of the present invention shall be described with reference to the drawings.

Before describing the embodiments of the present invention, experimental findings made by the inventor shall be discussed first. Experimental sound identification was performed on mixed sounds with changed combinations of a target sound and background sounds using frequency information of a most-likely model, in the same manner as the procedure described in Patent Reference 1. In the learning of a statistical learning model (hereafter, referred to simply as a "model" where appropriate), a synthetic sound in which the target sound was 15 dB against the background sounds was used. In addition, in the experimental sound identification, a synthetic sound in which the target sound was 5 dB against the background sounds was used.

FIG. 2 is a diagram showing the results of this experimental sound identification. FIG. 2 shows the identification rate, expressed as a percentage, in the case where the identification unit time T for calculating the identification frequency is fixed at 100 frames and the cumulative likelihood output unit time Tk for calculating the cumulative likelihood is altered between 1, 10, and 100 frames. In other words, in the case where the cumulative likelihood output unit time Tk=100 and the identification unit time T=100, a single piece of frequency information is outputted in a single unit time based on a single likelihood. For this reason, the process is the same as the procedure which uses only a cumulative likelihood.

Here, the results shall be examined in detail. When ambient sounds N1 through N17 are assumed to be the background sounds, and in the case where the sound to be identified is a sound M001, music M4, or the like, it can be seen that Tk=1 produces the best identification results. In other words, it can be seen that the procedure using the cumulative likelihood in which Tk=100 is not effective. On the other hand, in the case where the same ambient sound (with the exception of N13) is used as the background sound, and the sound to be identified is the ambient sound N13, Tk=100 shows the best results. In this manner, a trend in which the optimum Tk value differs depending on the type of the background sound can be seen in cases where the background sound is music or speech as well.

In other words, it can be seen that the cumulative likelihood output unit time Tk values in which the identification rate is the best change due to combinations of background sounds and target sounds. Conversely, when the cumulative likelihood output unit time Tk is a fixed value, as in Patent Reference 1, drops in the identification rate can be seen.

The present invention is based upon these findings.

According to the present invention, a model of a sound to be identified, which has been learned beforehand, is used in sound identification, the sound identification using frequency information based on the cumulative likelihood results of plural frames. Speech and music are given as sounds to be identified; the sounds of train stations, automobiles running, and railroad crossings are given as ambient sounds. The various sounds are assumed to have been modeled in advance based on characteristic amounts.

First Embodiment

Figure 3:
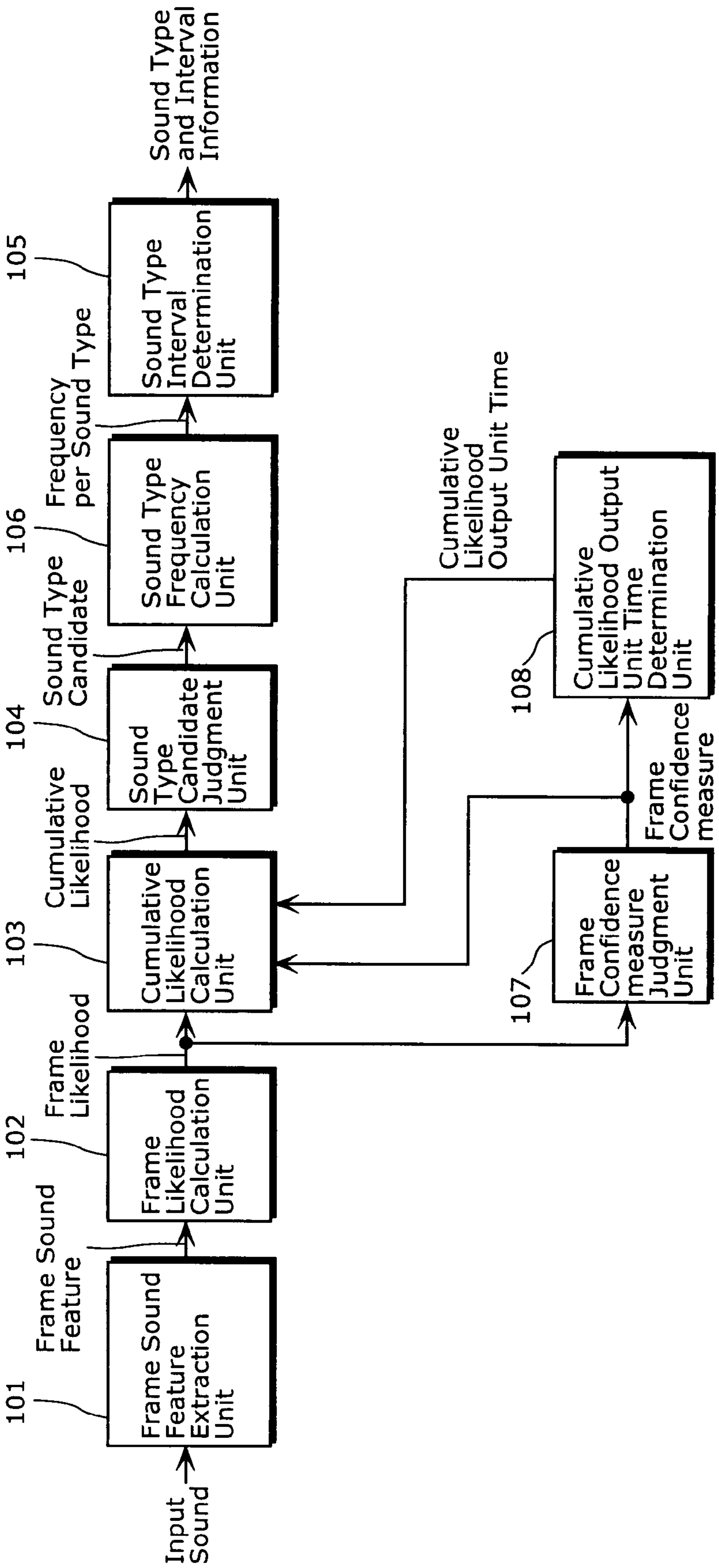
FIG. 3 is a diagram showing a configuration of a sound identification apparatus according to the first embodiment of the present invention.

FIG. 3 is a diagram showing a configuration of a sound identification apparatus according to the first embodiment of the present invention.

The sound identification apparatus includes: a frame sound feature extraction unit 101; a frame likelihood calculation unit 102; a cumulative likelihood calculation unit 103; a sound type candidate judgment unit 104; a sound type interval determination unit 105; a sound type frequency calculation unit 106; a frame confidence measure judgment unit 107; and a cumulative likelihood output unit time determination unit 108.

The frame sound feature extraction unit 101 is a processing unit which converts an inputted sound into a sound feature, such as Mel-Frequency Cepstrum Coefficients (MFCC) or the like, per frame of, for example, 10 millisecond lengths. While 10 milliseconds is given here as the frame time length which serves as the unit of calculation of the sound feature, 5 milliseconds to 250 milliseconds may be used as the frame time length depending on the characteristics of the target sound to be identified. When the frame time length is 5 milliseconds, it is possible to capture the frequency characteristics of an extremely short sound, and changes therein; accordingly, 5 milliseconds is best used for capturing and identifying sounds with fast changes, such as, for example, beat sounds, sudden bursts of sound, and so on. On the other hand, when the frame time length is 250 milliseconds, it is possible to capture the frequency characteristics of quasi-steady continuous sounds very well; accordingly, with 250 milliseconds, the frequency characteristics of sounds with slow changes or which do not change much, such as, for example, the sound of a motor, can be captured, and thus 250 milliseconds is best used for identifying such sounds.

The frame likelihood calculation unit 102 is a processing unit which calculates a frame likelihood, which is a likelihood for each frame, between a model and the sound feature extracted by the frame sound feature extraction unit 101.

The cumulative likelihood calculation unit 103 is a processing unit which calculates a cumulative likelihood in which a predetermined number of frame likelihoods have been cumulated.

The sound type candidate judgment unit 104 is a processing unit which judges candidates for different sound types based on cumulative likelihoods. The sound type frequency calculation unit 106 is a processing unit which calculates a frequency in the identification unit time T per sound type candidate. The sound type interval determination unit 105 is a processing unit which determines a sound identification and the interval thereof in the identification unit time T, based on frequency information per sound type candidate.

The frame confidence measure judgment unit 107 outputs a frame confidence measure based on the frame likelihood by verifying the frame likelihood calculated by the frame likelihood calculation unit 102. The cumulative likelihood output unit time determination unit 108 determines and outputs a cumulative likelihood output unit time T, which is a unit time in which the cumulative likelihood is converted to frequency information, based on the frame confidence measure which is in turn based on the frame likelihood outputted by the frame confidence measure judgment unit 107. Accordingly, the cumulative likelihood calculation unit 103 is configured so as to calculate a cumulative likelihood, in which the frame likelihoods have been accumulated, in the case where the confidence measure is judged to be high enough, based on the output from the cumulative likelihood output unit time determination unit 108.

To be more specific, the frame likelihood calculation unit 102 calculates, based on formula (1), a frame likelihood P between an identification target sound characteristic model Mi learned in advance through a Gaussian Mixture Model (denoted as "GMM" hereafter) and an input sound feature X. The GMM is described in, for example, "S. Young, D. Kershaw, J. Odell, D. Ollason, V. Valtchev, and P. Woodland, 'The HTK Book (for HTK Version 2.2), 7.1 The HMM Parameter.' (1999-1)".

[Equation 1]

$$P(X(t)|M_i = \sum_{m=1}^{N} \lambda_{im} \frac{1}{\sqrt{(2\pi)^n |\Sigma_{im}|}} \exp\left(\left(-\frac{1}{2}(X - \mu_{im})^t \sum_{im}^{-1} (X - \mu_{im})\right)\right) \quad \text{(Formula 1)}$$

X(t): input sound characteristic amount model in a frame t;

Mi: sound characteristic model i for identification target sound i ($\mu_{im}$ is an average value;

$\Sigma_{im}$ is a covariance matrix; $\lambda_{im}$ is a branch probability for a mixed distribution; m is a superscript expressing the distribution number of the mixed distribution; N is a mixed number;

n is a dimension number of a characteristic amount vector X);

$P(X(t)|M_i)$: the likelihood of the sound characteristic model Mi for the identification target sound i, for the input sound characteristic amount X(t) in the frame t In addition, the cumulative likelihood calculation unit 103 calculates, as a cumulative value of the likelihood P(X(t)|Mi) for each learned model Mi, a cumulative likelihood Li in a predetermined unit time, as shown in formula (2); a model I that indicates the maximum cumulative likelihood is selected and outputted as the closest identified sound type in this unit interval.

[Equation 2]

$$I = \underset{i}{\text{argmax}}(Li): \; Li = \sum_{t}^{T} P(X(t)|Mi) \quad \text{(Formula 2)}$$

Furthermore, the sound type candidate judgment unit 104 uses, as the sound type candidate, the model in which the cumulative likelihood for each learned model i outputted from the cumulative likelihood calculation unit 103 is maximum, per cumulative likelihood output unit time Tk; this is shown in the second part of formula (3). The sound type frequency calculation unit 106 and the sound type interval determination unit 105 output the sound identification results by outputting the model which has the maximum frequency in the identification unit time T based on the frequency information; this is shown in the first part of formula (3).

[Equation 3]

$$L = \underset{i}{\text{argmax}}(Hi): \; Hi \sum_{t}^{T/Tk} pi \quad \text{(Formula 3)}$$

$$pi = 1: \text{ if } i = J; \; \underset{J}{\text{argmax}}\left(\sum_{t}^{Tk} P(X|Mj)\right).$$

$$= 0: \text{ otherwise.}$$

Next, the specific processes of each block that makes up the first embodiment of the present invention shall be described using a flowchart.

Figure 4:
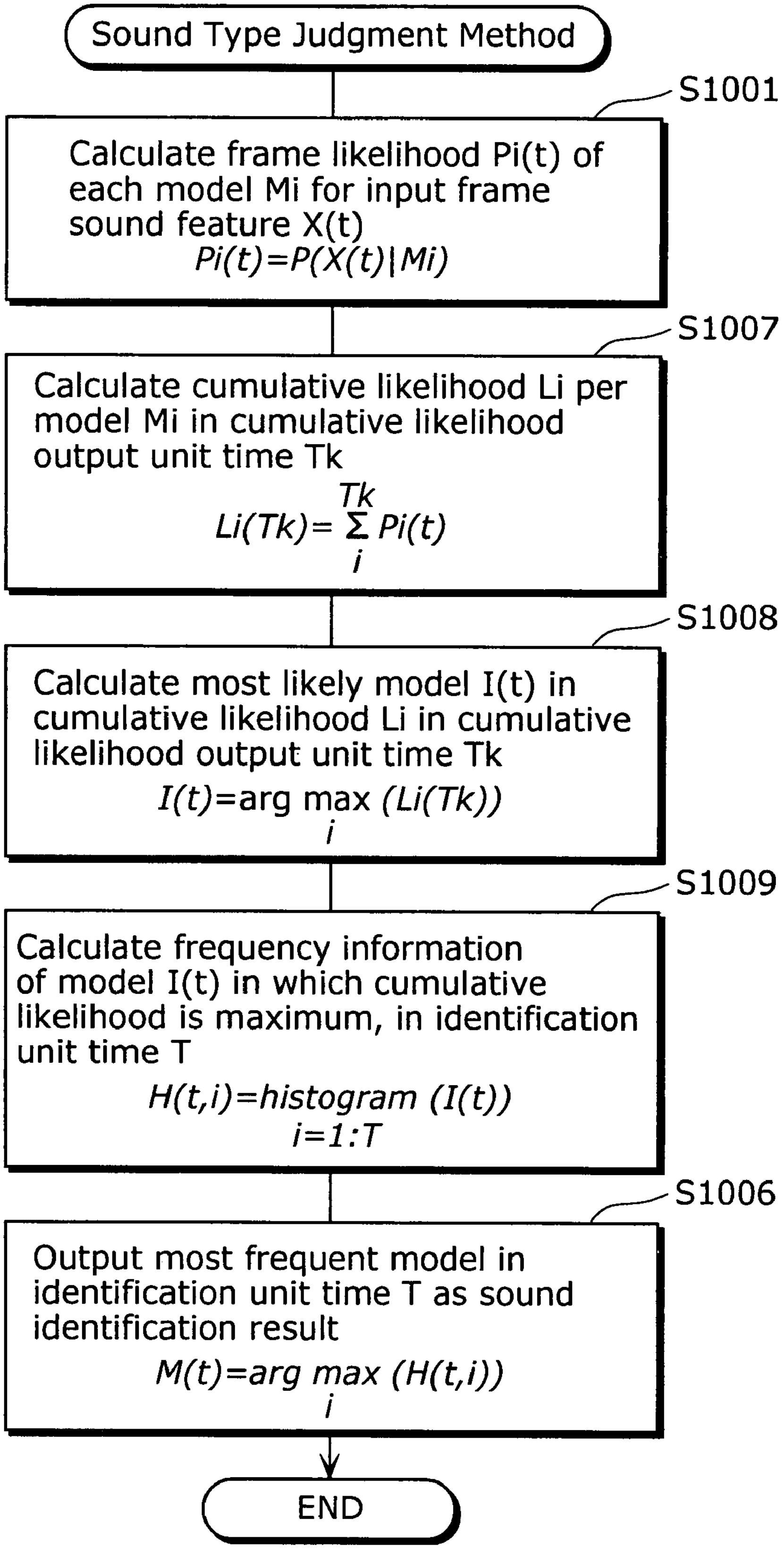
FIG. 4 is a flowchart showing a method for judging a sound type based on two unit times and frequency, in the first embodiment of the present invention.

FIG. 4 is a flowchart showing a procedure for a method for converting the cumulative likelihood into frequency information per cumulative likelihood output unit time Tk and determining the sound identification results per identification unit time T.

The frame likelihood calculation unit 102 finds, for an input sound feature X(t) in a frame t, each frame likelihood Pi(t) of the sound characteristic model Mi for the identification target sound (Step S1001). The cumulative likelihood calculation unit 103 calculates the cumulative likelihood of each model by accumulating, over the cumulative likelihood output unit time Tk, the frame likelihood of each model for the input characteristic amount X(t) obtained in Step S1001 (Step S1007), and the sound type candidate judgment unit 104 outputs, as the sound identification candidate for that time, the model in which the likelihood is maximum (Step S1008). The sound type frequency calculation unit 106 calculates the frequency information of the sound identification candidate found in Step S1008 in the interval of the identification unit time T (Step S1009). Finally, the sound type interval determination unit 105 selects, based on the obtained frequency information, the sound identification candidate for which the frequency is maximum, and outputs the candidate as the identification results for the present identification unit time T (Step S1006).

By setting the cumulative likelihood output unit time Tk of step S1007 to the same value as the identification unit time T, this method can also function as a method for a cumulative likelihood in which a single maximum frequency is outputted for each identification unit time. In addition, this method can also function as a method for selecting a most-likely model with the frame likelihood as a standard of reference, if the cumulative likelihood output unit time Tk is thought of as one frame.

Figure 5:
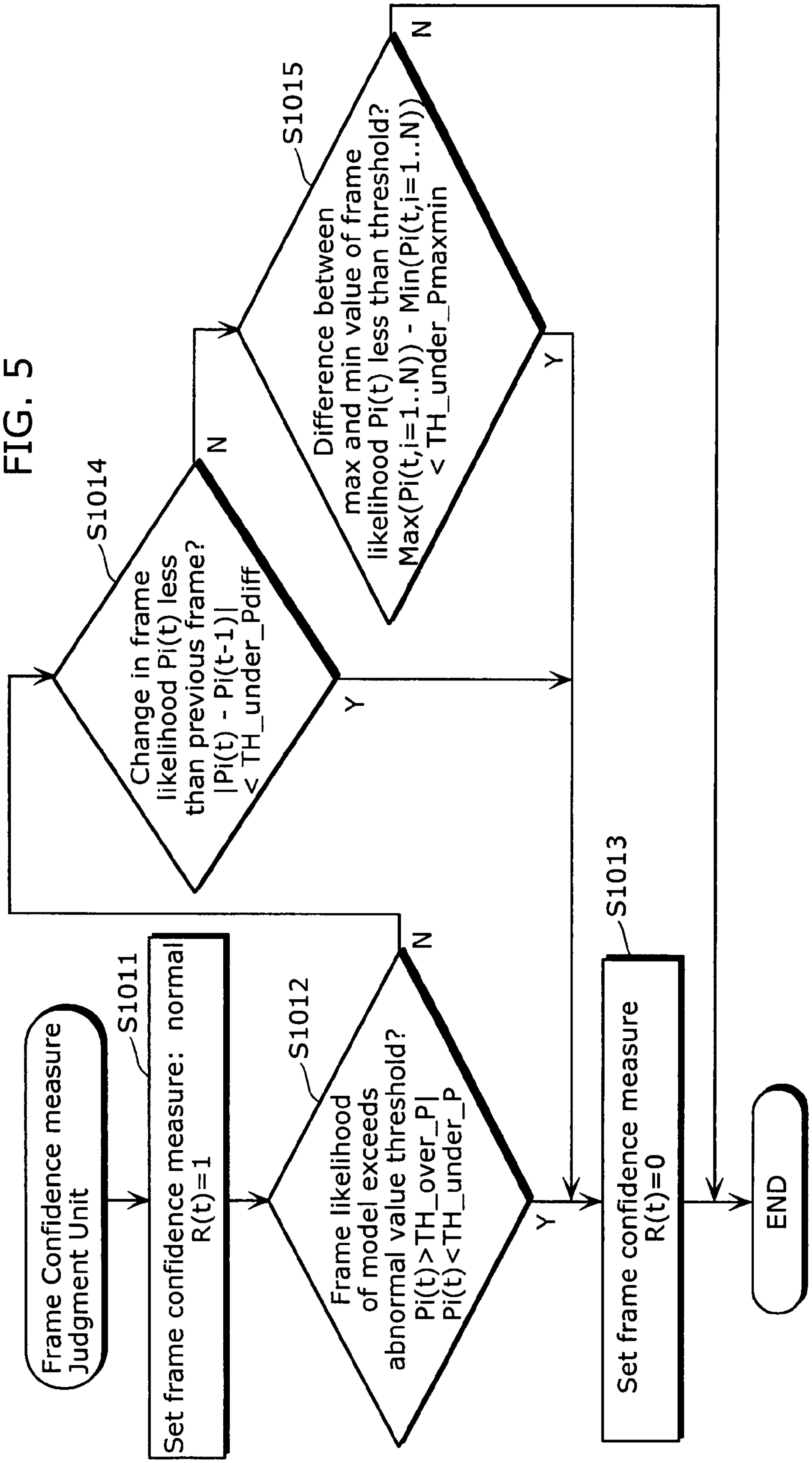
FIG. 5 is a flowchart showing processing executed by a frame confidence measure judgment unit in the first embodiment of the present invention.

FIG. 5 is a flowchart showing and example of operations performed by a frame confidence measure judgment unit 107. The frame confidence measure judgment unit 107 performs processing for calculating the frame confidence measure based on the frame likelihood.

The frame confidence measure judgment unit 107 resets, in advance, the frame confidence measure to a maximum value (in the diagram, 1) based on the frame likelihood (Step S1101). In the case where any of the three conditional expressions in steps S1012, S1014, and S1015 are fulfilled, the frame confidence measure judgment unit 107 judges the confidence measure by setting the confidence measure to an abnormal value, or in other words, to a minimum value (in the diagram, 0) (Step S1013).

The frame confidence measure judgment unit 107 judges whether or not the frame likelihood Pi(t) for each model Mi of the input sound feature X(t) calculated in Step S1001 is greater than an abnormal threshold value TH_over_P, or is less than an abnormal threshold value TH_under_P (Step S1012). In the case where the frame likelihood Pi(t) for each model Mi is greater than the abnormal threshold value TH_over_P, or in the case where the frame likelihood Pi(t) for each model Mi is less than the abnormal threshold value TH_under_P, it is thought that there is no reliability whatsoever. It can be thought that such a situation arises in the case where the input sound feature is of a range outside of a certain assumed range, a model in which learning has failed, or the like.

Moreover, the frame confidence measure judgment unit 107 judges whether or not the change is low between the frame likelihood Pi(t) and the previous frame likelihood Pi(t−1) (Step S1014). Sounds in an actual environment are always in fluctuation, and thus if sound input is performed properly, changes in likelihood occurring in response to the changes in sound are permitted. Accordingly, in the case where the likelihood is so low that changes in the likelihood are not permitted even when the frame changes, it can be thought that the input sound itself or the input of the sound feature has been cut off.

Furthermore, the frame confidence measure judgment unit 107 judges whether or not the difference between the frame likelihood value for the model in which the calculated frame likelihood Pi(t) is maximum and the model likelihood value in which the calculated frame likelihood Pi(t) is minimum is lower than a threshold value (Step S1015). It is thought that this indicates that a superior model, which is close to the input sound feature, is present in the case where the difference between the maximum and minimum values of the frame likelihood for the model is greater than the threshold, whereas none of models are superior in the case where the difference is extremely low. Accordingly, this is used as the confidence measure. In the case where the difference between the maximum and minimum values of the frame likelihood is less than the threshold value (Y in Step S1015), the frame confidence measure judgment unit 107 assumes the present frame to be of an abnormal value, and sets the frame confidence measure to 0 (Step S1013). On the other hand, in the case where the comparison result is greater than or equal to the threshold value (N in Step S1015), it is assumed that a superior model is present, and thus the frame confidence measure can be set to 1.

In this manner, it is possible to calculate the frame confidence measure based on the frame likelihood, determine the cumulative likelihood output unit time Tk using the information regarding a frame with a high frame confidence measure, and calculate the frequency information.

Figure 6:
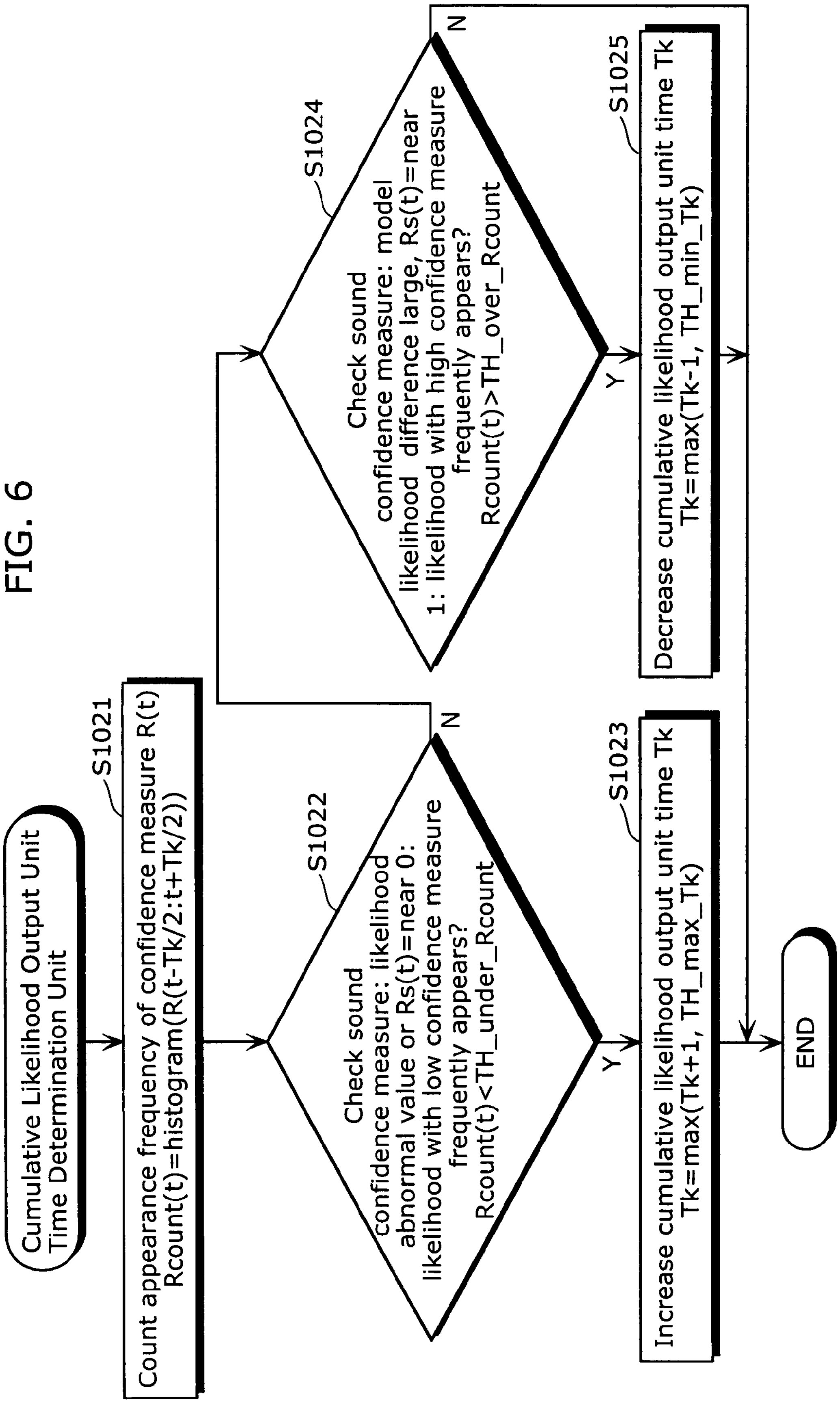
FIG. 6 is a flowchart showing processing executed by a cumulative likelihood output unit time judgment unit in the first embodiment of the present invention.

FIG. 6 is a flowchart showing a cumulative likelihood output unit time determination method, which indicates an example of an operation executed by the cumulative likelihood output unit time judgment unit 108. The cumulative likelihood output unit time determination unit 108 calculates, in the interval in which the present cumulative likelihood output unit time Tk is determined, the frequency information of the frame confidence measure in order to find the appearance trend of the frame confidence measure R(t) based on the frame likelihood (Step S1021). In the case where a frame confidence measure of 0 or frame confidence measures R(t) close to 0 frequently appear in the analyzed appearance trend, which indicates that the input sound feature is abnormal (Y in Step S1022), the cumulative likelihood output unit time determination unit 108 causes the cumulative likelihood output unit time Tk to increase (Step S1023).

In the case where frame confidence measures R(t) close to 1 frequently appear (Y in Step S1024), the cumulative likelihood output unit time determination unit 108 causes the cumulative likelihood output unit time Tk to decrease (Step S1025). Through this, in the case where the frame confidence measure R(t) is low, the number of frames is lengthened and the cumulative likelihood found, whereas when the frame confidence measure R(t) is high, the number of frames is shortened and the cumulative likelihood found; because the frequency information can be obtained based on the results thereof, it is possible to automatically obtain identification results of the same accuracy as compared to conventional methods in a relatively short identification unit time.

Figure 7:
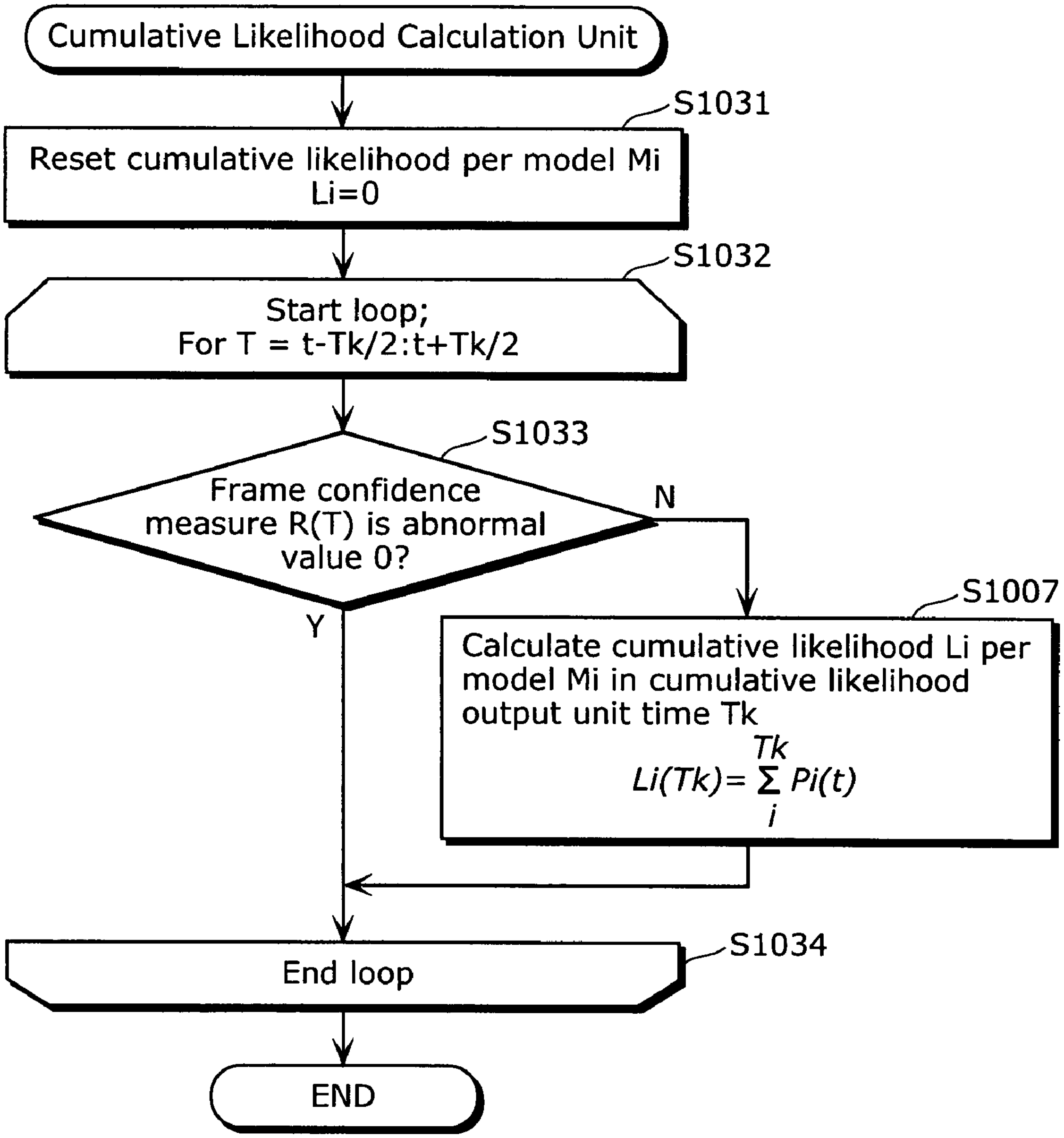
FIG. 7 is a flowchart showing processing performed by a cumulative likelihood calculation unit in which the frame confidence measure is used, in the first embodiment of the present invention.

FIG. 7 is a flowchart showing a cumulative likelihood calculation method, which indicates an example of an operation performed by the cumulative likelihood calculation unit 103. In FIG. 7, constituent elements identical to those shown in FIG. 4 are given the same reference numbers, and descriptions thereof shall be omitted. The cumulative likelihood calculation unit 103 resets the cumulative likelihood Li(t) per model (Step S1031). A small-scale element connection unit 103 calculates the cumulative likelihood in the loop that runs from Step S1032 to Step S1034. At this time, the small-scale element connection unit 103 judges whether or not the frame confidence measure R(t) is 0, indicating an abnormality, based on the frame likelihood (Step S1033); the cumulative likelihood per model is calculated as shown in Step S1007 only in the case where the value is not 0 (N in Step S1033). In this manner, the cumulative likelihood calculation unit 103 can calculate the cumulative likelihood without including sound information with no reliability, by calculating the cumulative likelihood while taking into consideration the frame confidence measure. For this reason, it can be thought that the identification rate can increase. The frequency information outputted as shown in FIG. 7 is accumulated by the sound type frequency calculation unit 106 during the predetermined identification unit time T; the sound type interval determination unit 105 selects, in accordance with formula (3), the model in which the frequency in the identification unit interval is a maximum, and determines the identification unit interval.

Figure 8:
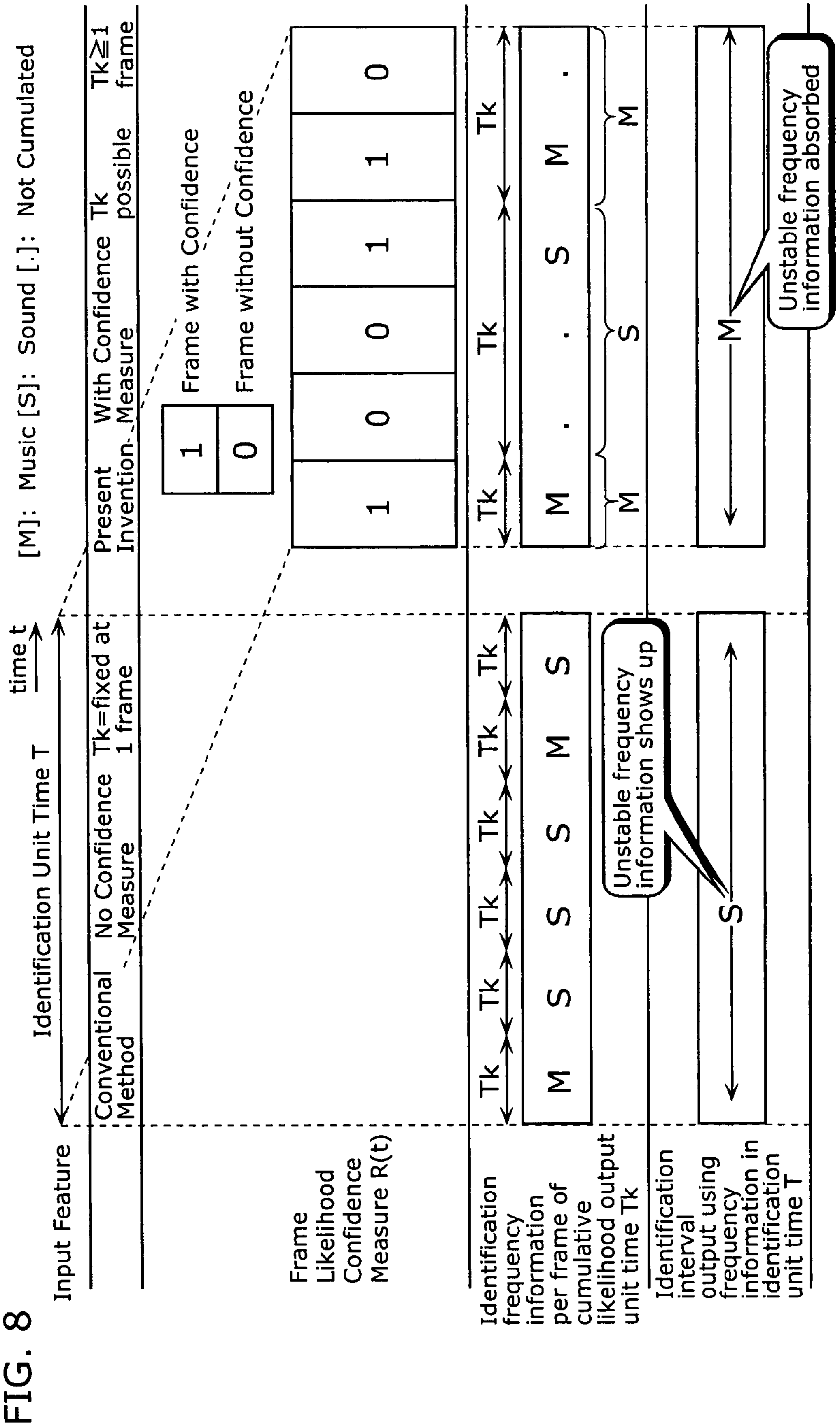
FIG. 8 is a conceptual diagram indicating a procedure for calculating the identification frequency, in which the frame confidence measure is used, in the first embodiment of the present invention.

FIG. 8 is a conceptual diagram showing a method for calculating the frequency information outputted using the sound identification apparatus shown in FIG. 3. In this diagram, a specific example of identification results in the case where the sound type of music is inputted shall be given, and effects of the present invention described. In the identification unit time T, likelihoods for a model are found per single frame of the input sound feature, and the frame confidence measure is calculated for each frame from the likelihood group for each model. The horizontal axis in the diagram represents time, and a single segment indicates a single frame. Here, the calculated likelihood confidence measures are given either a maximum value of 1 or a minimum value of 0; a maximum value of 1 is an indicator showing the likelihood is reliable, whereas a minimum value of 0 is an indicator of an abnormal value that indicates the likelihood is unreliable.

With the conventional method, or in other words, in conditions where the cumulative likelihood output unit time Tk is fixed, the frequency information of the model with the maximum likelihood, from among the likelihoods obtained from each single frame, is calculated. The conventional method is a method which does not use the confidence measure, and thus the frequency information of the outputted most-likely model is reflected as-is. The information outputted as the sound identification results is determined via the frequency information per interval. In the example in this diagram, the frequency results indicate 2 frames of sound type M (music) and 4 frames of sound type S (sound) in the identification unit time T; from this, the most frequent model in the identification unit time T is the sound type S (sound), and thus a result in which the identification is mistaken is obtained.

On the other hand, under the conditions in which the frequency information is calculated using the likelihood confidence measure, as according to the present invention, the confidence measure per frame is indicated by a value of either 1 or 0, as indicated by the steps in the diagram; the frequency information is outputted as the unit time, which is for calculating the cumulative likelihood using this confidence measure, changes. For example, a frame likelihood judged to be unreliable is not directly converted into frequency information, and rather is calculated as cumulative likelihood until a frame judged to be reliable is reached. In this example, there is an interval in which the confidence measure is 0, and as a result, the most-frequent frequency information in the identification unit time T, which is of the sound type M (music), is outputted as the frequency information. As the most-frequent model in the identification unit time T is that of the sound type M (music), it can be seen that the correct sound type has been identified. Therefore, as an effect of the present invention, it can be expected that identification results can be improved through absorbing unstable frequency information, by not directly using frame likelihoods judged to be unreliable.

According to such a configuration, when converting the cumulative likelihood information to frequency information, by converting the frequency information based on the likelihood confidence measure, the length of the cumulative likelihood calculation unit time can be appropriately set even in cases where sudden sounds occur frequently and sound types frequently switch (the cumulative likelihood calculation unit time can be set to be short in the case where the confidence measure is higher than a predetermined value, and longer in the case where the confidence measure is lower than the predetermined value). For this reason, it can be thought that a drop in the identification rate of a sound can be suppressed. Furthermore, it is possible to identify a sound based on a more appropriate cumulative likelihood calculation unit time, and thus a drop in the identification rate of a sound can be suppressed, even in the case where background noise and the target sound have changed.

Figure 9:
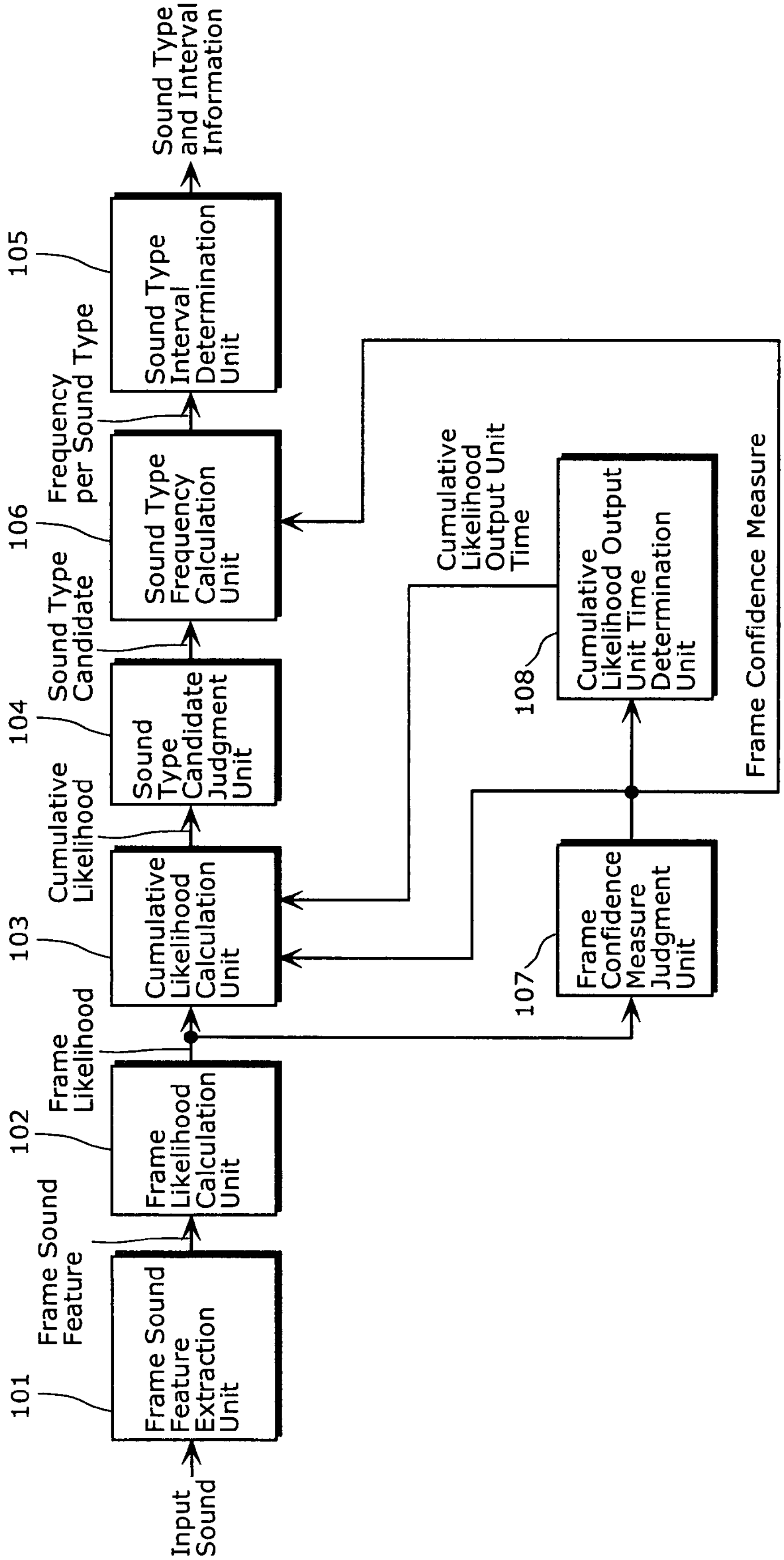
FIG. 9 is a diagram showing a second configuration of a sound identification apparatus according to the first embodiment of the present invention.

Next, a second configuration of a sound identification apparatus according to the first embodiment of the present invention, which is shown in FIG. 9, shall be described. In FIG. 9, constituent elements identical to those shown in FIG. 3 shall be given the same reference numbers, and descriptions thereof shall be omitted.

The difference between FIG. 9 and FIG. 3 is as follows: the configuration is such that when the sound type frequency calculation unit 106 calculates the sound type frequency information from the sound type candidate information output by the sound type candidate judgment unit 104, calculation is performed using the frame confidence measure outputted by the frame confidence measure judgment unit 107.

According to such a configuration, when converting the sound type candidate calculated from the cumulative likelihood information to frequency information, by converting to frequency information based on the likelihood confidence measure, it is possible to reduce the influence of sudden abnormal sounds over a short amount of time; therefore, it is possible to suppress a drop in the identification rate by using a more appropriate cumulative likelihood calculation unit time, even when there is background noise present or the target sound changes.

Figure 10:
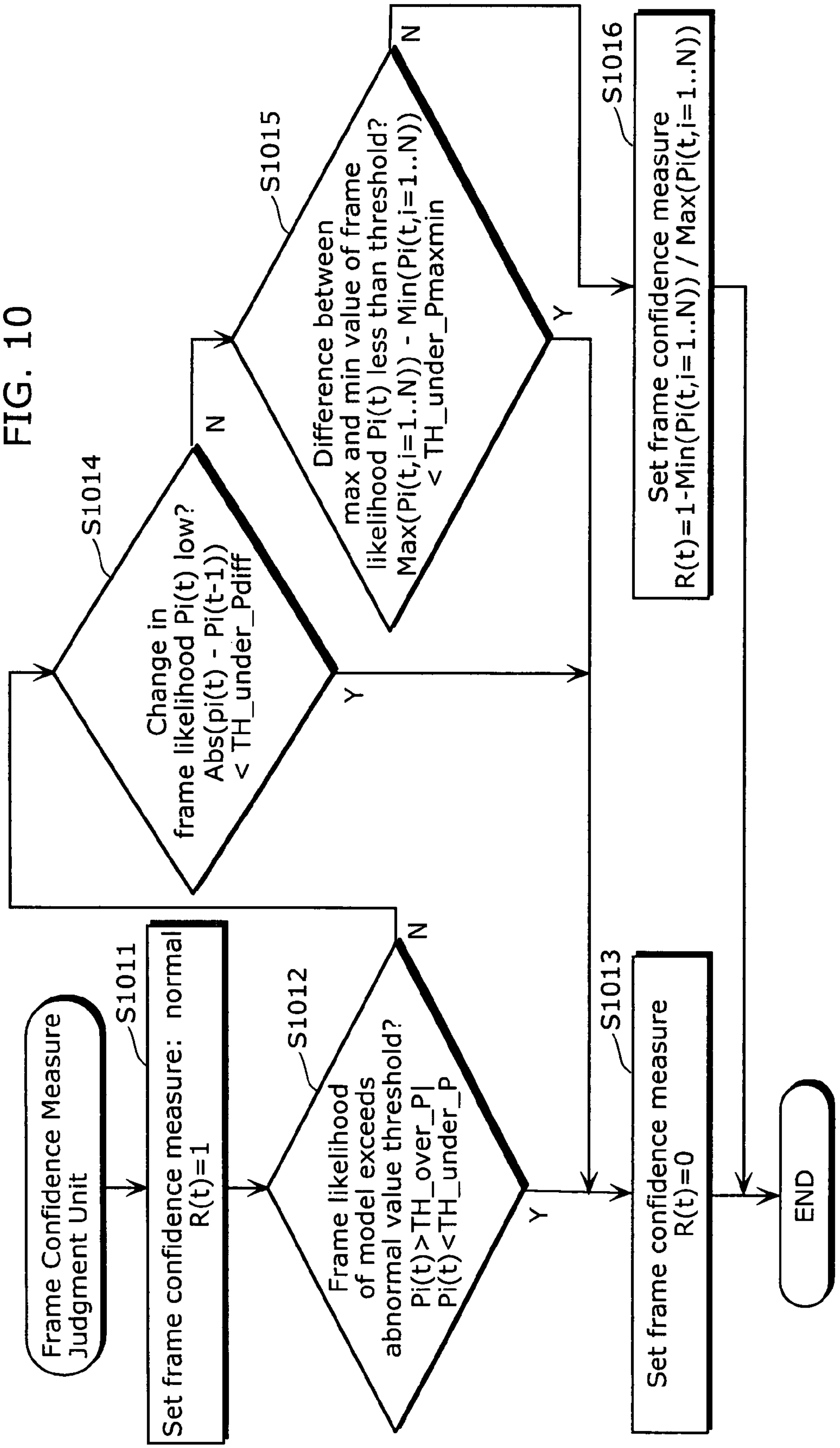
FIG. 10 is a second flowchart showing processing executed by a frame confidence measure judgment unit in the first embodiment of the present invention.

FIG. 10 is a flowchart showing a second example of a procedure performed by the frame confidence measure judgment unit 107, which is used as a procedure for determining the frame reliability based on the frame likelihood. In FIG. 10, processes identical to those shown in FIG. 5 shall be given the same reference numbers, and descriptions thereof shall be omitted. In the procedure in FIG. 5, in Step S1015, the frame confidence measure judgment unit 107 calculates the frame likelihood for each model of the input characteristic amount, and whether the difference between the frame likelihood value of the model with the maximum frame likelihood and the frame likelihood value of the model with the minimum frame likelihood is lower than a threshold value is used to set the confidence measure at 0 or 1.

Here, the frame confidence measure judgment unit 107 sets the confidence measure to take on an intermediate value between 0 and 1, rather than setting the confidence measure at either 0 or 1. Specifically, as in Step S1016, the frame confidence measure judgment unit 107 can add, as a further standard for the confidence measure, a measure for judging how superior the frame likelihood of the model with the maximum value is. Accordingly, the frame confidence measure judgment unit 107 may use a ratio between the maximum and minimum values of the frame likelihood as the confidence measure.

Figure 11:
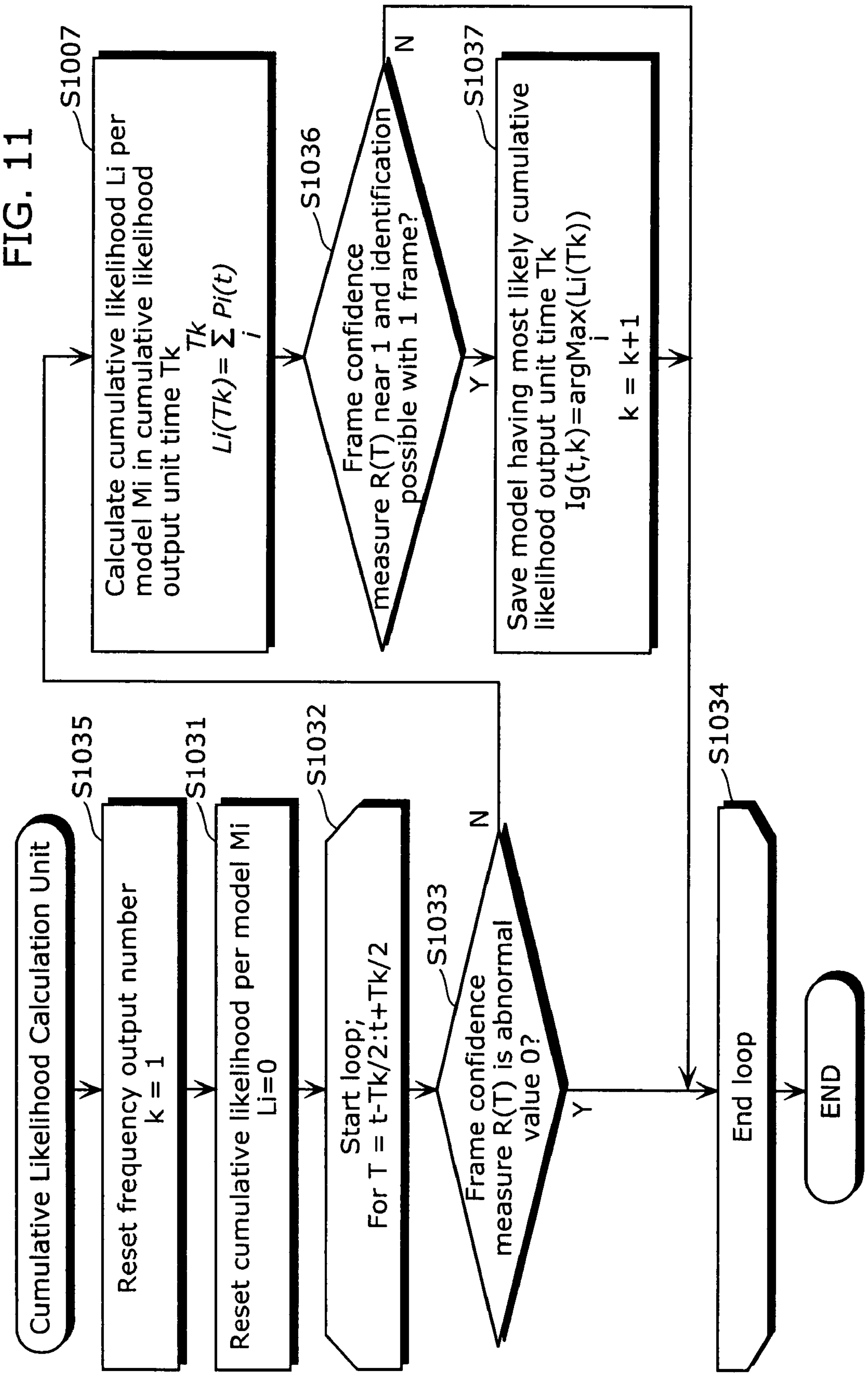
FIG. 11 is a second flowchart showing processing performed by a cumulative likelihood calculation unit in which the frame confidence measure is used, in the first embodiment of the present invention.

FIG. 11 is a flowchart showing a cumulative likelihood calculation method which indicates an example of operations performed by the cumulative likelihood calculation unit 103 which is different from that shown in FIG. 7. In FIG. 11, processes identical to those shown in FIG. 7 are given the same reference numbers, and descriptions thereof shall be omitted. In this example of operations, the cumulative likelihood calculation unit 103 resets the number of pieces of frequency information that have been outputted (Step S1035), and judges, at the time of cumulative likelihood calculation, whether or not the frame confidence measure is near 1 (Step S1036). In the case where the frame confidence measure has been accepted as being sufficiently high (Y in Step S1036), the cumulative likelihood calculation unit 103 saves a likelihood model identifier so as to directly output the frequency information of the frame in question (Step S1037). Furthermore, in the processing performed by the sound type candidate judgment unit 104 shown in Step S1038 in FIG. 12, the sound type candidates based on the plural maximum models saved in Step S1037 is outputted, in addition to the model in which the cumulative likelihood in the unit identification interval Tk is maximum. As opposed to using a single sound type candidate, as is the case in Step S1008 in FIG. 4, the sound type candidate judgment unit 104 outputs k+1 sound type candidates, in the case where k number of highly-reliable frames are present. The result is that sound type candidates with frequency information, in which the information of highly-reliable frames is weighted, are outputted.

Figure 12:
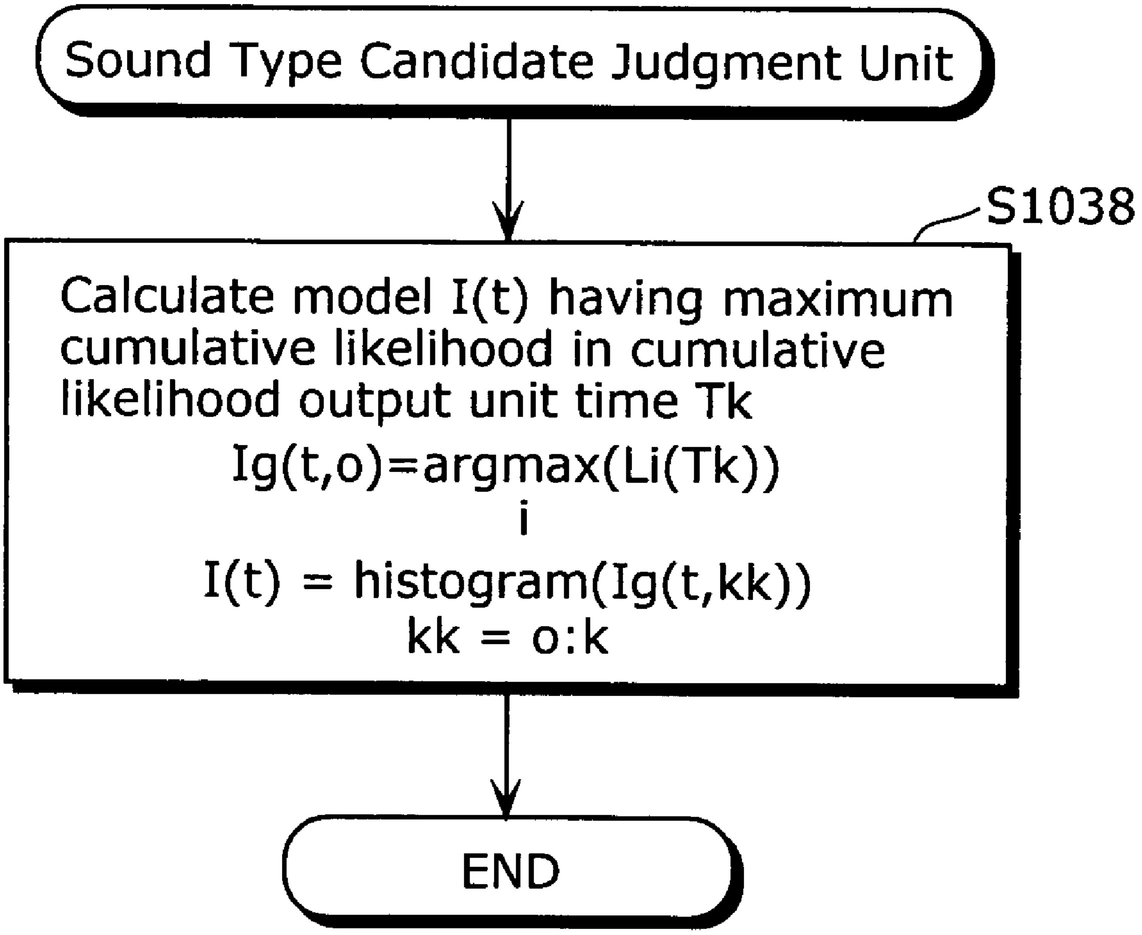
FIG. 12 is a flowchart showing processing executed by a sound type candidate judgment unit.

The sound type frequency calculation unit 106 finds the frequency information by accumulating, over the interval of the identification unit time T, the sound type candidates outputted in accordance with the processing shown in FIGS. 11 and 12. In addition, the sound type interval determination unit 105 selects the model with the maximum frequency in the identification unit interval, and determines the identification unit interval, in accordance with formula (3).

Note that the sound type interval determination unit 105 may select the model that has the maximum frequency information only in an interval in which frequency information with a high confidence measure is concentrated, and may then determine the sound type and interval thereof. In this manner, information in intervals with low frame confidence measures is not used, and the accuracy of identification can be improved.

Figure 13:
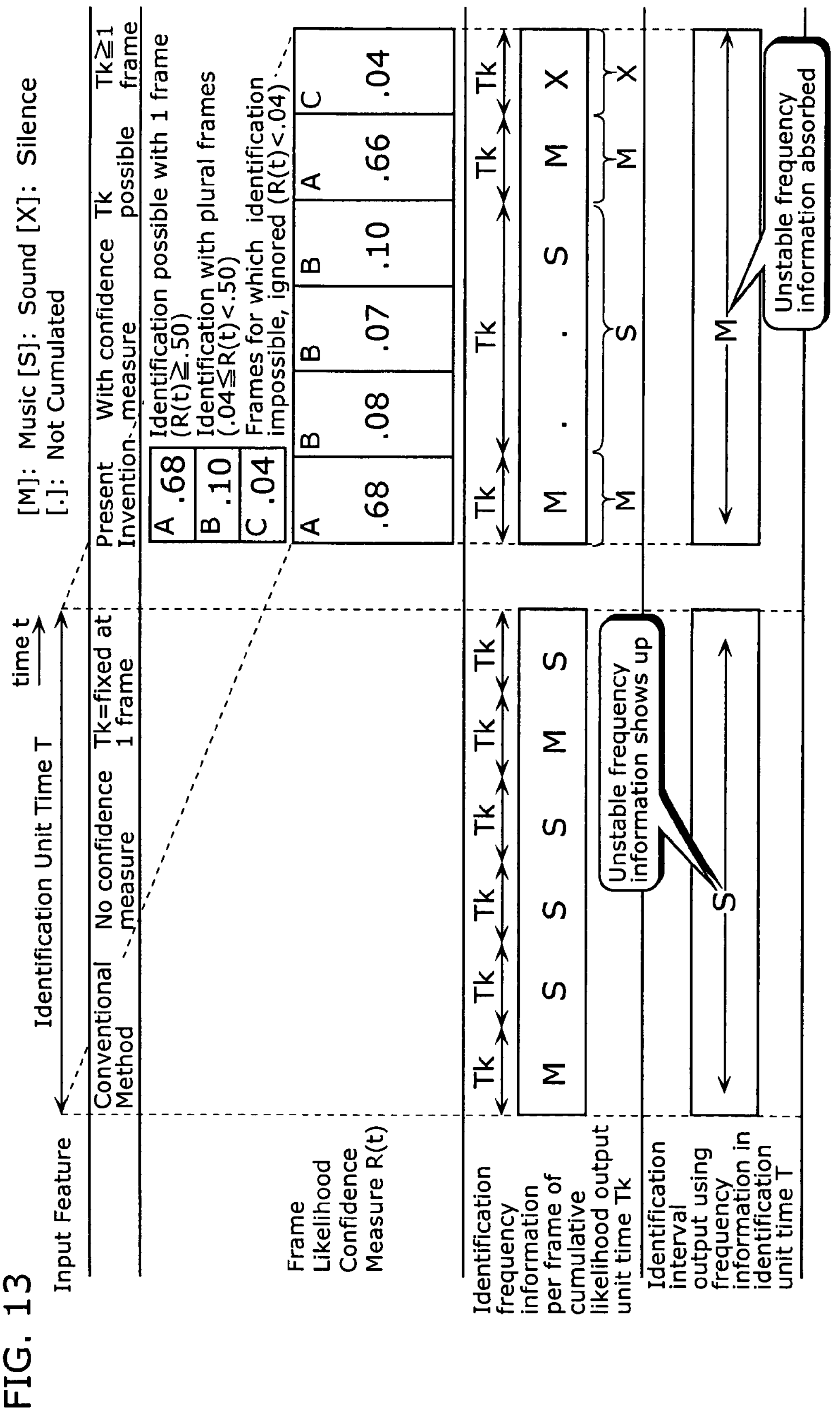
FIG. 13 is a second conceptual diagram indicating a procedure for calculating the identification frequency, in which the frame confidence measure is used, in the first embodiment of the present invention.

FIG. 13 is a conceptual diagram showing a method for calculating the frequency information outputted from the sound identification apparatus shown in FIG. 3 or FIG. 9. In the identification unit time T, likelihoods for a model are found per single frame of the input sound feature, and the frame confidence measure is calculated for each frame from the likelihood group for each model. The horizontal axis in the diagram represents time, and a single segment indicates a single frame. Here, the calculated likelihood reliability is assumed to be normalized so as to be a maximum value of 1 and a minimum value of 0; the closer the value is to the maximum value of 1, the higher the reliability of the likelihood (the state A in the diagram, in which the identification is sufficient even for a single frame), whereas the closer the value is to the minimum value of 0, the lower the reliability of the likelihood is considered to be (the state C in the diagram, in which the frame has no reliability whatsoever, and the intermediate state B). In this example, the frame cumulative likelihood is calculated by verifying the calculated likelihood confidence measure using two threshold values, as shown in FIG. 11. The first threshold value judges whether or not a single frame of the outputted likelihood is sufficiently large and thus reliable. In the example in the diagram, in the case where the confidence measure is 0.50 or greater, the likelihood confidence measure based on the cumulative likelihood of only one frame can be converted into the frequency information. The second threshold value judges whether or not the likelihood confidence measure can be converted into the frequency information due to the outputted likelihood confidence measure being too low. In this example, this applies to cases in which the confidence measure is less than 0.04. In the case where the likelihood reliability is between these two threshold values, the likelihood reliability is converted to the frequency information based on the cumulative likelihood over plural frames.

Here, the effects of the present invention shall be described using specific examples of identification results. With the conventional method, or in other words, in conditions where the cumulative likelihood output unit time Tk is fixed, the frequency information of the model with the maximum likelihood, from the likelihoods obtained from each single frame, is calculated. Therefore, in the same manner as the results shown in FIG. 8, the frequency results indicate 2 frames of sound type M (music) and 4 frames of sound type S (sound) in the identification unit time T; the most frequent model in the identification unit time T is the sound type S (sound), and thus the identification is mistaken.

On the other hand, under conditions in which the frequency information is calculated using the likelihood confidence measure, as in the present invention, it is possible to find the frequency information based on three levels of reliability, while having the cumulative likelihood be of variable length, from a frame with a likelihood than can be converted to frequency information from the likelihood of only a single frame. Accordingly, it is possible to obtain identification results without directly using the frequency information of an unstable interval. In addition, in the case of a frame in which the reliability is low and the frequency information is accordingly not being used, such as the last frame in the identification target interval T in the diagram, it is possible to calculatingly ignore the cumulative likelihood. In this manner, it can be expected that identification can be performed with even further accuracy by having the confidence measure in a multiple-stepped form.

It should be noted that in the above example, descriptions are given in which a single identification judgment result is outputted in the identification unit time T; however, plural identification judgment results may be outputted with an interval of high reliability or an interval of low reliability being used as a base point. With such a configuration, the identification results for the identification unit time T are not outputted at a fixed timing; rather, it is possible to appropriately output information of an interval with high reliability at a changeable timing. Therefore, even if, for example, the identification unit time T is set to be longer, results can be quickly obtained in intervals in which the identification results are probable due to the confidence measure. It is possible to quickly obtain results for a highly-reliable interval even in the case where the identification unit time T is set to be shorter as well.

Note that while descriptions have been given in which MFCC is assumed as the sound feature learning model used by the frame sound feature extraction unit 101 and GMM is used as the model, the present invention is not limited to these models; a Discrete Fourier Transform (DFT), Discrete Cosine Transform (DCT), a Modified Discrete Cosine Transform (MDCT) or the like, which express the characteristic amount as a frequency characteristic amount, may be used as well. In addition, a Hidden Markov Model (HMM), which takes into consideration state transition, may be used as a model learning method.

In addition, a model learning method may be used after using a statistical method such as principle component analysis (PCA) to analyze or extract components such as the independence of the sound feature.

Second Embodiment

Figure 14:
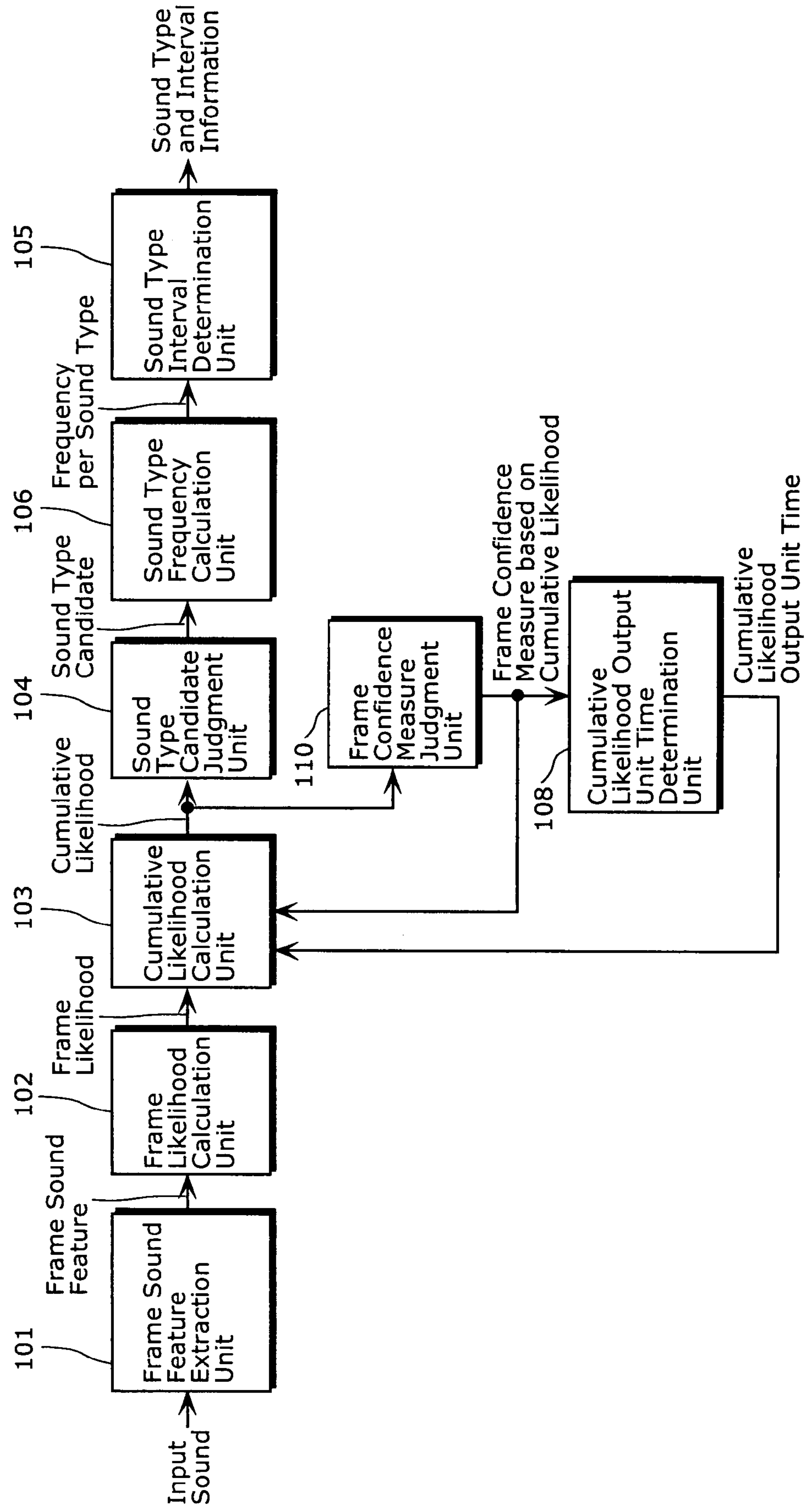
FIG. 14 is a diagram showing a configuration of a sound identification apparatus according to the second embodiment of the present invention.

FIG. 14 is a diagram showing a configuration of a sound identification apparatus according to the second embodiment of the present invention. In FIG. 14, constituent elements identical to those shown in FIG. 3 shall be given the same reference numbers, and descriptions thereof shall be omitted. In the first embodiment, the method uses a sound information confidence measure per frame based on a frame likelihood; however, in the present embodiment, the frame reliability is calculated using the cumulative likelihood, and the resultant is used to calculate the frequency information.

In FIG. 14, the configuration is such that the frame confidence measure judgment unit 110 calculates the cumulative likelihood per model of the present time as calculated by the cumulative likelihood calculation unit 103, and the cumulative likelihood output unit time is determined by the cumulative likelihood output unit time determination unit 108.

Figure 15:
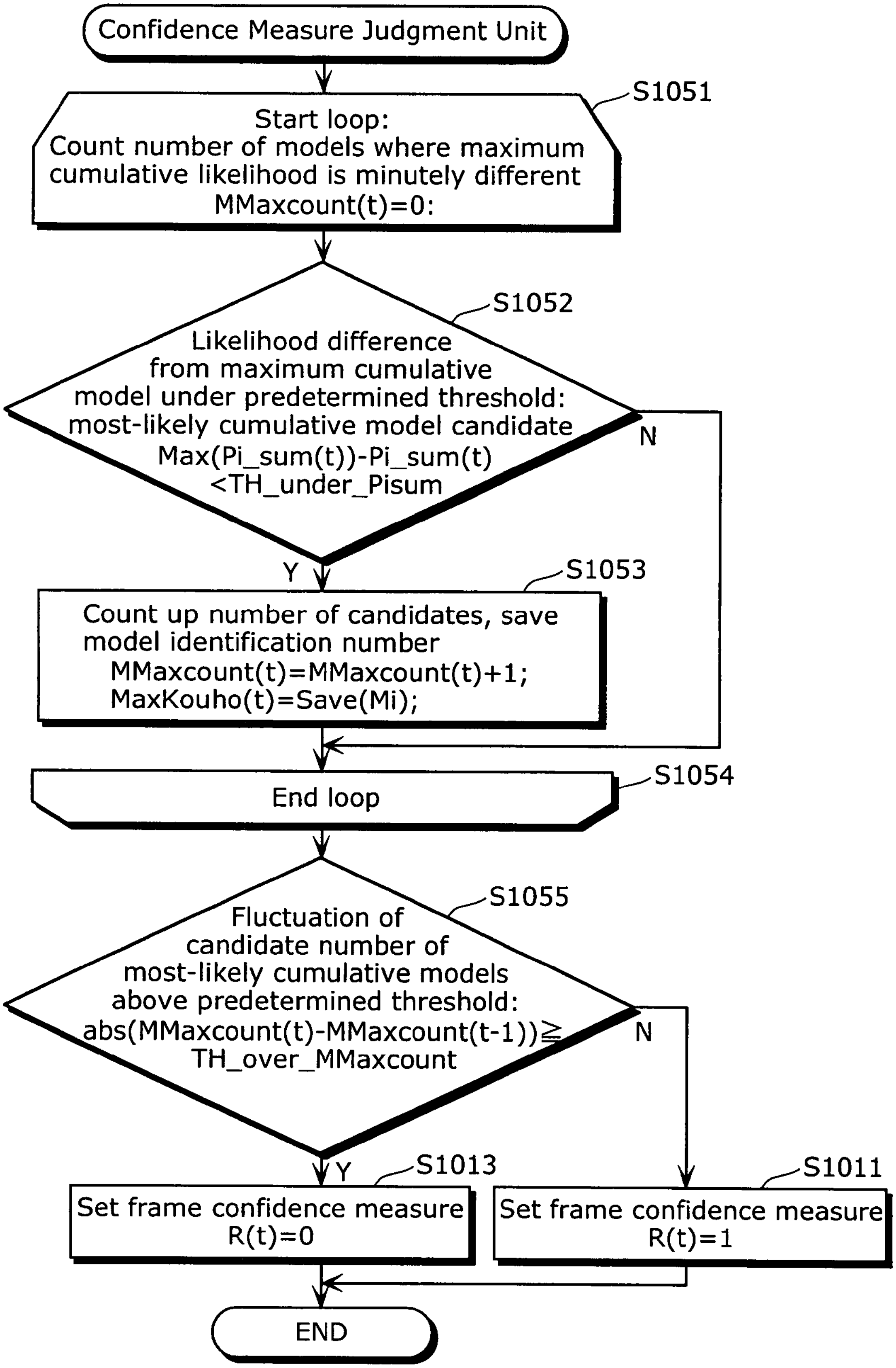
FIG. 15 is a flowchart showing processing performed by a frame confidence measure judgment unit, in the second embodiment of the present invention.

FIG. 15 is a flowchart showing a procedure for determining the frame confidence measure based on the cumulative likelihood, as performed by the frame confidence measure judgment unit 110. In FIG. 15, constituent elements identical to those shown in FIG. 5 are given the same reference numbers, and descriptions thereof shall be omitted. From Step S1051 to Step S1054, the frame confidence measure judgment unit 110 counts the number of models for which most-likely cumulative likelihood is minutely different in the unit time. The frame confidence measure judgment unit 110 judges, for each model, whether or not the difference between the cumulative likelihood for each model calculated by the cumulative likelihood calculation unit 103 and the most-likely cumulative likelihood is within a predetermined value (Step S1052). In the case where the difference is within the predetermined value (Y in Step S1052), the frame confidence measure judgment unit 110 counts the number of candidates and saves the model identifiers (Step S1053). In Step S1055, the frame confidence measure judgment unit 110 outputs the abovementioned candidate number per frame, and judges whether or not the change in the number of candidates for the cumulative likelihood model is within a predetermined value (Step S1055). In the case where the change is greater than the predetermined value (Y in Step S1055), the frame confidence measure judgment unit 110 sets the frame confidence measure to an abnormal value of 0 (Step S1013), and in the case where the change is less than the predetermined value (N in Step S1055), the frame confidence measure judgment unit 110 sets the frame confidence measure to a normal value of 1 (Step S1011).

Through such a configuration, it is possible to find changes in the input sound from changes in the abovementioned candidates, and thus it can be speculated that changes will occur in the makeup of mixed sounds that include the identification target sound and background noise. This can be thought of as useful in the case where the identification target sound continues to occur while the background noise changes and a sound similar to the target sound repeatedly appears and disappears in the background.

Note that a change in the sound type candidates calculated in the above manner, or in other words, the combination of identifiers within a predetermined value from the most-likely cumulative likelihood, may be detected, and the change point or the amount in which the number of candidates has increased or decreased may be used as the frame confidence measure and converted to the frequency information.

Figure 16:
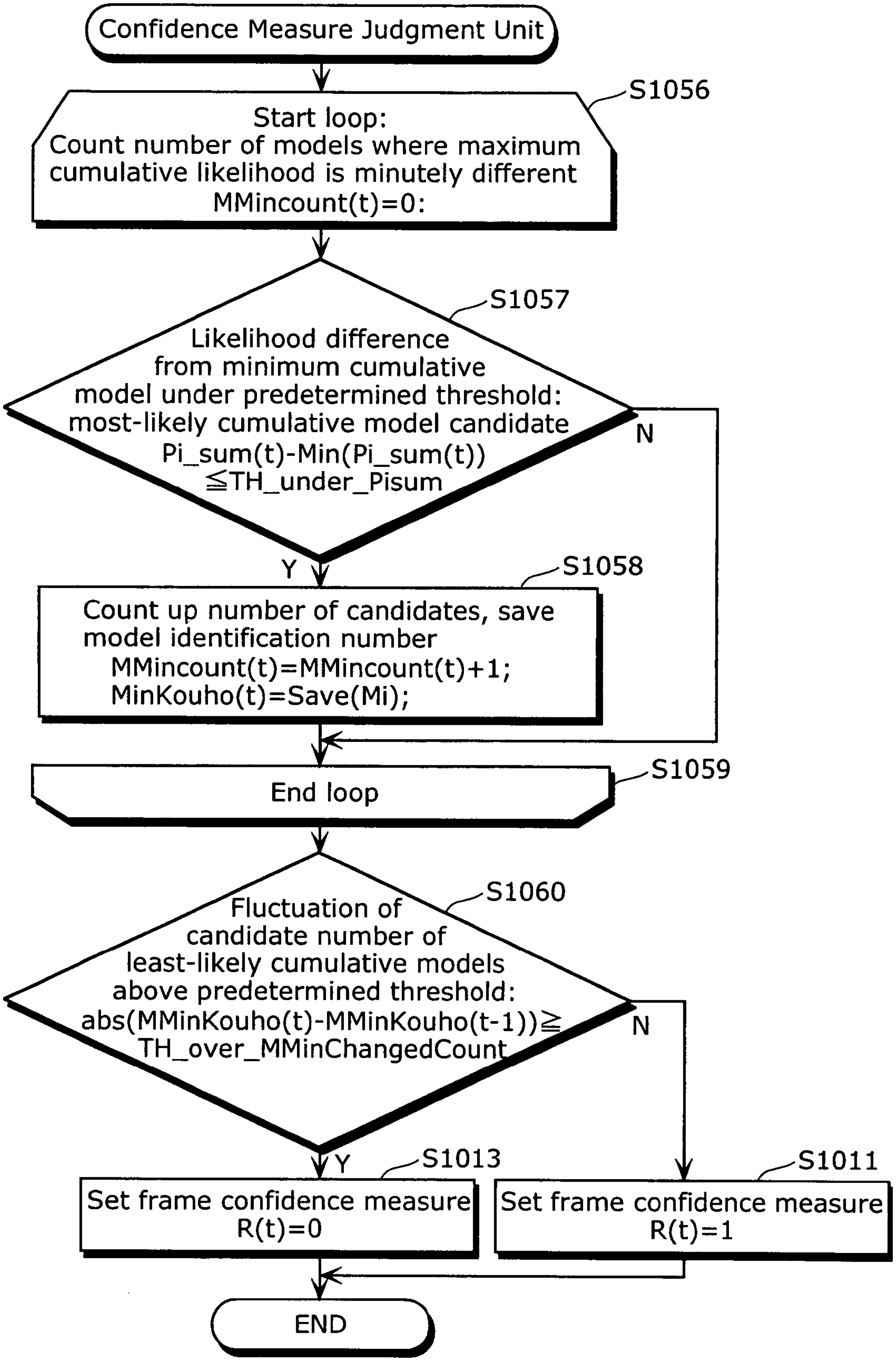
FIG. 16 is a second flowchart showing processing executed by a frame confidence measure judgment unit in the second embodiment of the present invention.

FIG. 16 is a flowchart showing a procedure for determining the frame confidence measure based on the cumulative likelihood, as performed by the frame confidence measure judgment unit 110. In FIG. 16, constituent elements identical to those shown in FIG. 5 and FIG. 15 are given the same reference numbers, and descriptions thereof shall be omitted. In the present procedure, as opposed to FIG. 15, the minimum cumulative likelihood is used as a standard of reference, and the confidence measure is acquired using the number of model candidates in which the cumulative likelihood is minutely different. In the loop from Step S1056 to Step S1059, the frame confidence measure judgment unit 110 counts the number of models in which the minimum cumulative likelihood in the unit time is minutely different. The frame confidence measure judgment unit 110 judges, for each model, whether or not the difference between the cumulative likelihood for each model calculated by the cumulative likelihood calculation unit 103 and the minimum cumulative likelihood is less than a predetermined value (Step S1057). In the case where the difference is less than the predetermined value (Y in Step S1057), the frame confidence measure judgment unit 110 counts the number of candidates and saves the model identifiers (Step S1058). The frame confidence measure judgment unit 110 judges whether or not the change in the number of candidates for the minimum cumulative model as calculated in the abovementioned steps is greater than or equal to a predetermined value (Step S1060), and in the case where the change is greater than or equal to the predetermined value (Y in Step S1060), the frame confidence measure judgment unit 110 sets the frame confidence measure to 0 and judges that there is no reliability (Step S1013), whereas in the case where the change is less than the predetermined value (N in Step S1060), the frame confidence measure judgment unit 110 sets the frame confidence measure to 1 and judges that there is reliability (Step S1011).

Note that a change in the sound type candidates calculated in the above manner, or in other words, the combination of identifiers from the lowest cumulative likelihood, may be detected, and the change point or the amount in which the number of candidates has increased or decreased may be used as the frame confidence measure and converted to the frequency information.

In addition, in the abovementioned FIGS. 15 and 16, descriptions have been given in which the frame confidence measure is calculated, using the number of models within a predetermined likelihood value range, from models with maximum and minimum likelihoods respectively; however, the frame likelihood may be calculated using information of both the number of models in which the likelihood is within a range from the maximum likelihood to the predetermined value and the number of models in which the likelihood in within a range from the minimum likelihood to the predetermined value, and the frame likelihood converted to the frequency information.

It should be noted that a model within a range from the most-likely cumulative likelihood to the predetermined likelihood is a model in which the probability of the model as the sound type of the interval in which the cumulative likelihood has been calculated is extremely high. Accordingly, assuming that only the model judged in Step S1053 to have a likelihood within the predetermined range is a reliable model, the confidence measure may be created per model and used in conversion to frequency information. In addition, a model within a range from the lowest cumulative likelihood to the predetermined value is a model in which the probability of the model as the sound type of the interval in which the cumulative likelihood has been calculated is extremely low. Accordingly, assuming that only the model judged in Step S1058 to have a likelihood within the predetermined range is an unreliable model, the confidence measure may be created per model and used in conversion to frequency information.

Note that in the abovementioned configuration, descriptions have been given regarding a method for using the frame confidence measure based on the cumulative likelihood and converting the frame confidence measure into the frequency information; however, the frame confidence measure based on the frame likelihood may be compared with the frame confidence measure based on the cumulative likelihood, an interval in which the two match may be selected, and the frame confidence measure based on the cumulative likelihood may be weighted.

With such a configuration, it is possible to maintain a short frame unit response time while using the frame confidence measure based on the cumulative likelihood. Therefore, it is possible to detect an interval in which the frame confidence measure based on the frame likelihood is being transited, even in the case where the frame confidence measure based on the cumulative likelihood continues and the same sound type candidates are outputted. Therefore, it is also possible to detect a degradation in likelihood over a short period of time due to rapidly occurring sounds or the like.

In addition, in the first embodiment or the second embodiment, descriptions have been given regarding a method in which a frame confidence measure calculated based on the likelihood or the cumulative likelihood is used in converting the frequency information; however, the frequency information or identification results may further be outputted using a sound type candidate confidence measure in which a confidence measure is provided per sound model.

Figure 17:
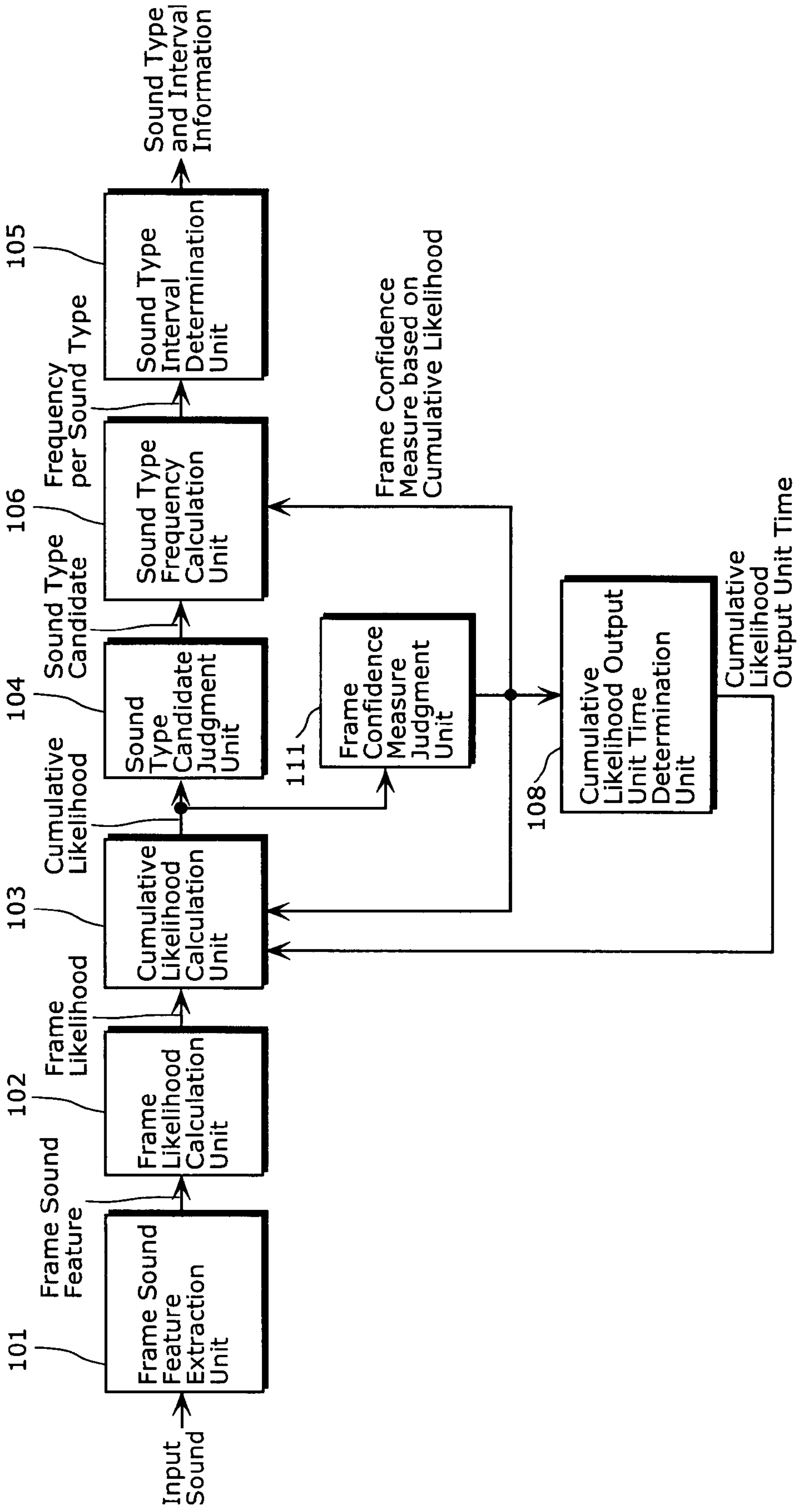
FIG. 17 is a diagram showing a second configuration of a sound identification apparatus according to the second embodiment of the present invention.

FIG. 17 is a diagram showing a second configuration of a sound identification apparatus according to the second embodiment of the present invention. In FIG. 17, constituent elements identical to those shown in FIG. 3 and FIG. 14 are given the same reference numbers, and descriptions thereof shall be omitted. In the embodiment shown in FIG. 14, a frame confidence measure based on a cumulative likelihood is calculated and frequency information outputted; however, in the present structure, a sound type candidate confidence measure is calculated, and the sound type candidate confidence measure is used to calculate the frequency information.

In FIG. 17, the configuration is such that a sound type candidate confidence measure judgment unit 111 calculates the cumulative likelihood per model of the present time as calculated by the cumulative likelihood calculation unit 103, and the cumulative likelihood output unit time is determined by the cumulative likelihood output unit time determination unit 108.

Figure 18:
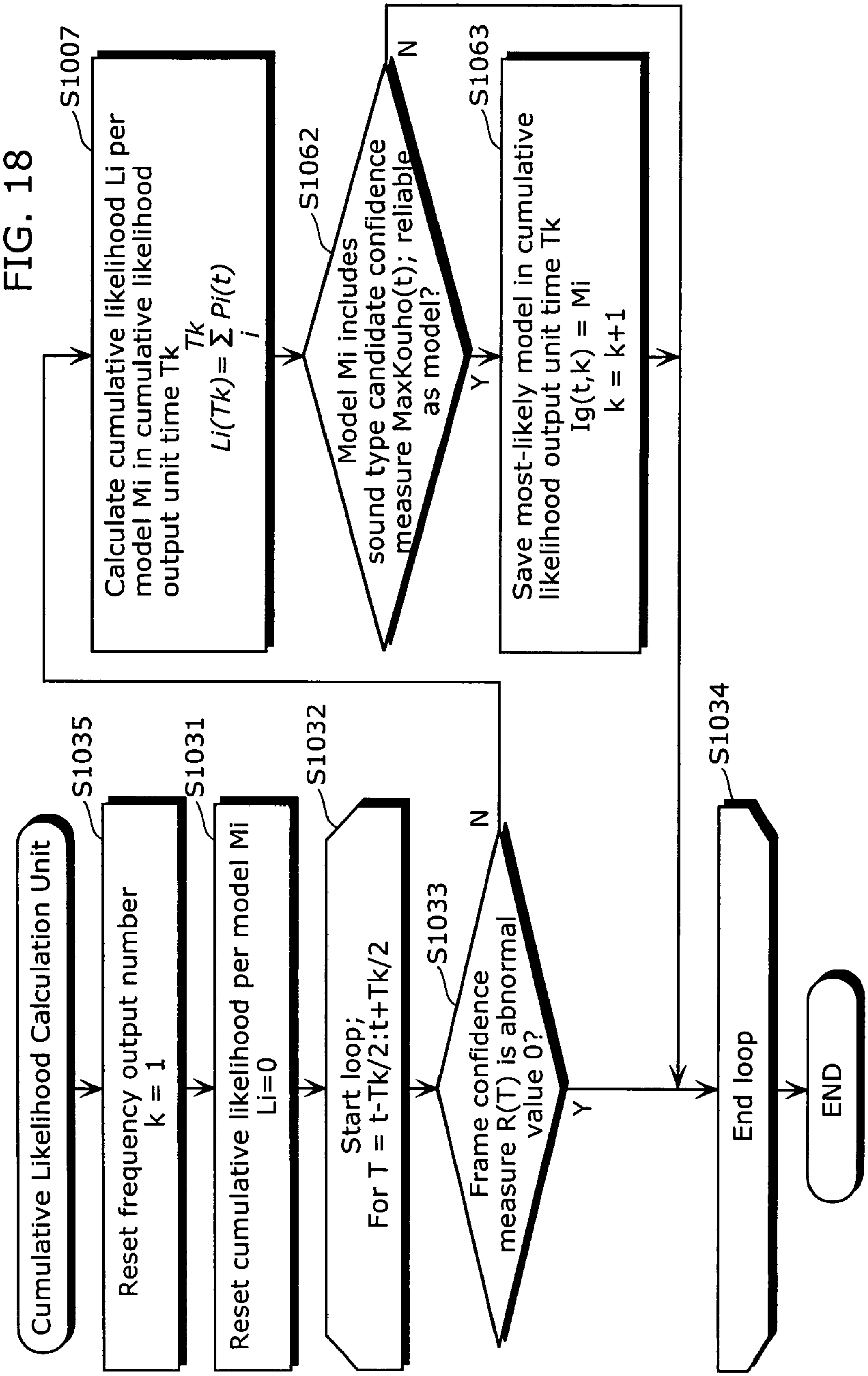
FIG. 18 is a flowchart showing a cumulative likelihood calculation processing in which the confidence measure of the sound type candidate is used, in the second embodiment of the present invention.

FIG. 18 is a flowchart showing a cumulative likelihood calculation processing which uses the sound type candidate confidence measure, which has been calculated based on a standard in which the sound type candidate, which has a cumulative likelihood that is within a range from the most likely sound type to a predetermined value, is reliable. Constituent elements identical to those shown in FIG. 11 shall be given the same reference numbers, and descriptions thereof shall be omitted. In the case where there is a model Mi for which the most-likely cumulative likelihood and the cumulative likelihood are within a predetermined value within the identification unit time (Y in Step S1062), the cumulative likelihood calculation unit 103 saves that model as a sound type candidate (Step S1063), and through the flow shown in FIG. 12, the sound type candidate judgment unit 104 outputs the sound type candidates.

By using such a configuration, it is possible to provide a confidence measure per model using the sound type candidate confidence measure, and therefore it is possible to output frequency information in which the model has been weighted. In addition, in the case where a predetermined number of pieces of the frequency information is above a predetermined threshold value, or the frequency information is above the predetermined threshold value for a certain period of time, it is possible to output the identification results with less delay in the sound identification interval even when the identification unit time T has passed, by determining the sound type and outputting it with the interval information.

Next, a method for outputting the sound identification results in which mistaken identifications are suppressed, the mistaken identifications arising because there is almost no frequency difference between sound types in the frequency information obtained in the interval of the identification unit time T, or in other words, because a superior sound type is not present.

As mentioned above, in the case where a sound in which music (M) and sound (S) alternately appear is the input sound, and the frame confidence measure is high, sound type candidates are outputted even if the identification unit time T is not reached. However, in the case where background noise or other noise (N) that resembles the music (M) is present, or many models that resemble alternately-appearing sound (S) or music (M) are present, and a single model cannot be isolated, the frame reliability drops, as opposed to the case described above. Furthermore, if each cumulative likelihood interval Tk continues in and interval in the identification unit time T of a length of time that cannot be ignored, the frequency number obtained in the identification unit time T drops. As a result, there are cases in which the difference in the frequency of music (M) and sound (S) in the identification unit time T decreases. In such cases, there is a problem in that as a model in which the frequency information is maximum in the identification unit time T, no superior model is present, and a sound type candidate which differs from the actual sound type is outputted.

Accordingly, in a variation on the present embodiment, the appearance frequency of each sound type in the cumulative likelihood output unit time Tk in within the identification unit time T is used, and the sound identification frequency calculation unit 106 shown in FIG. 17 is given a function for judging whether or not the sound type results outputted in a single identification unit time T are reliable.

Figure 19:
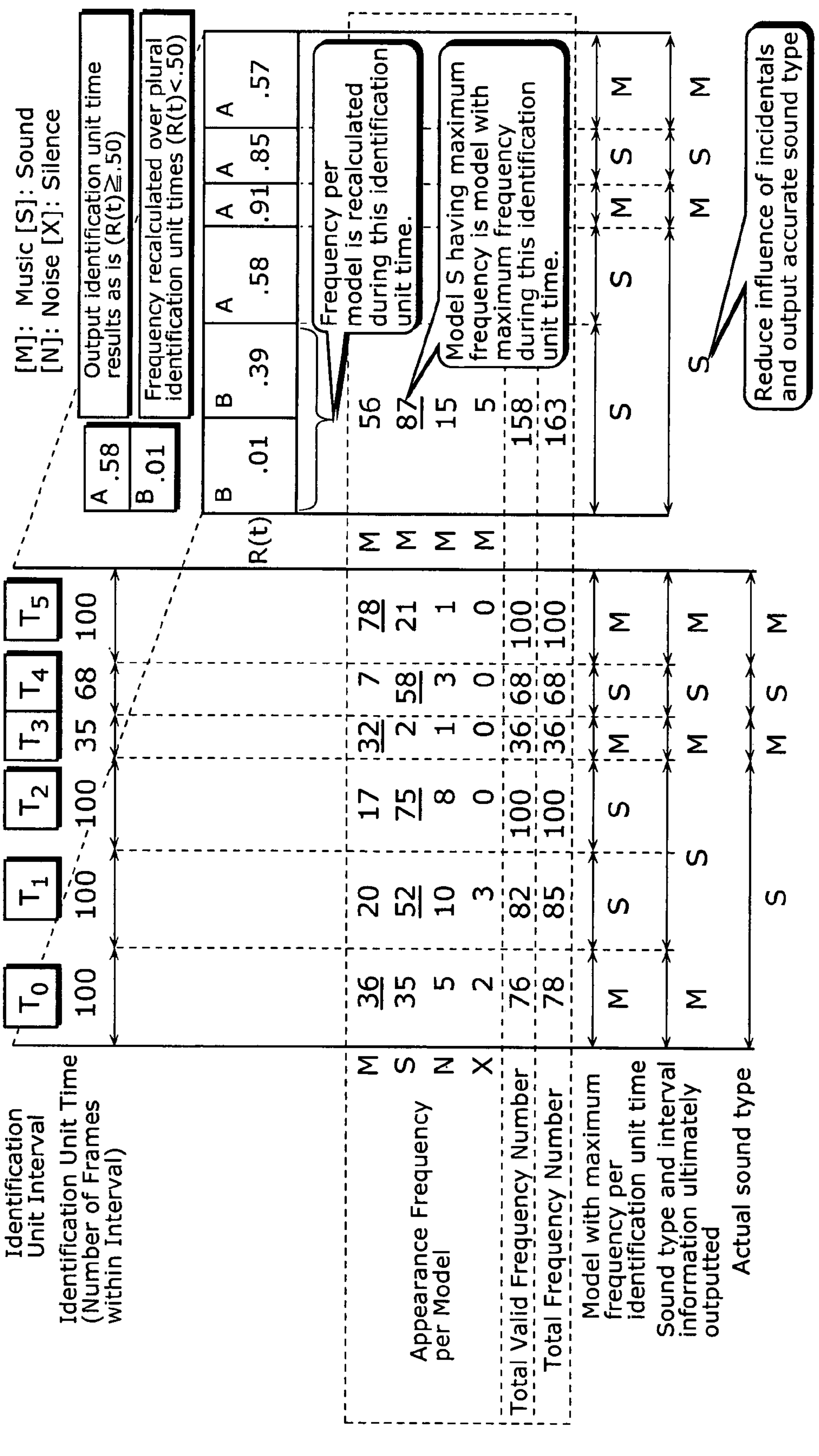
FIG. 19 is a diagram showing examples of sound types and interval information output in the case where a sound type interval determination unit uses the appearance frequency per sound type in a cumulative likelihood output unit time Tk within an identification unit time T and performs re-calculation over plural identification unit intervals (FIG. 19(*b*)) and the case where the appearance frequency is not used (FIG. 19(*a*))

FIG. 19 shows examples of sound types and interval information output in the case where the sound type interval determination unit 105 uses the appearance frequency per sound type in a cumulative likelihood output unit time Tk within an identification unit time T and performs re-calculation over plural identification unit intervals (FIG. 19(*b*)) and the case where the appearance frequency is not used (FIG. 19(*a*)).

In FIG. 19, in the identification unit intervals T0 to T5 determined by the sound type interval determination unit 105, examples are given regarding each identification unit time, the appearance frequency of each model, total valid frequency number, the total frequency number, the model with the maximum frequency per identification unit time, the sound type results ultimately outputted from the sound type interval determination unit 106, and the sound type of the sound that actually occurred.

First, the identification unit time is, as a rule, a predetermined value T (100 frames, in this example); however, in the case where the frame reliability at the time when the sound type frequency calculation unit 106 outputs the cumulative likelihood is above the predetermined value for a predetermined number of consecutive frames, the cumulative likelihood is outputted even if the identification unit time does not reach the predetermined value T, and therefore the identification unit time is shorter than the predetermined value in the identification unit intervals T3 and T4 shown in the diagram.

Next, the appearance frequency per model is shown. Here, "M" indicates music, "S" indicates sound, "N" indicates noise, and "X" indicates silence. The appearance frequency in the first identification time interval T0 is 36 for M, 35 for S, 5 for N, and 2 for X. Therefore, in this case, the most frequent model is M. In FIG. 19, the most frequently appearing models in each identification unit interval are indicated by underlines. Here, the "total frequency number" in FIG. 19 is the total number of frequencies in each identification unit interval, and the "total valid frequency number" is the total frequency out of the total frequency number minus the appearance frequency of silence X. As indicated by the identification unit intervals T0 and T1 in the diagram, in intervals in which the total frequency number (78 and 85 respectively) is smaller than the frame number (100 and 100 respectively) in the identification unit interval, it can be seen, as shown in FIGS. 8 and 13, that the cumulative likelihood output unit time has lengthened, unstable frequency information is absorbed, and the frequency number has declined. Therefore, throughout the intervals T0 to T5, the most frequent models outputted for each identification unit time are, respectively, "MSSMSM", assuming that time is represented by the horizontal.

As opposed to the example shown in FIG. 19, descriptions shall now be given regarding the sound identification and interval information output in the case where the sound type interval determination unit 106 does not use the appearance frequency. In this case, the most frequent model is used as the sound type as-is without the sound type frequency from the sound type frequency calculation unit 105 being evaluated; in the case where there are continuing parts present, the intervals are integrated and ultimately outputted as the sound type and interval information (the intervals of the identification unit times T1 and T2 are concatenated, forming a single S interval). In the example shown in FIG. 19, if the actual sound types are compared, in the case of not using the appearance frequency, the sound type M is outputted during the identification time unit T0 despite the actual sound type being S, from which it can be seen that the identification results are not improved and remain mistaken.

Next, descriptions shall be given of the case in which the appearance frequency is used. Using the frequency of each model per identification unit time outputted by the sound identification frequency calculation unit 106 shown in FIG. 17, the most frequent model in the identification unit time is judged using a frequency confidence measure that indicates whether or not the most frequent model in the identification unit time is reliable. Here, the frequency confidence measure is a value in which the appearance frequency difference of differing models in the identification unit interval is divided by the total valid frequency number (a number in which an invalid frequency such as the silent interval X is excluded from the total frequency number of the identification unit interval). At this time, the frequency confidence measure value is a value between 0 and 1. For example, in the case of judging between music (M) and sound (S), the frequency confidence measure value is a value in which the difference between the appearance frequencies of M and S is divided by the total valid frequency number. In this case, the frequency confidence measure takes on a value in closer to 0 the smaller the difference between M and S in the identification unit interval, and takes on a value closer to 1 the more instances of either M or S there are. The difference between M and S being small, or in other words, the value of the frequency confidence measure being close to 0, indicates a state in which it cannot be known which of M and S is reliable in the identification unit interval. FIG. 19(*b*) shows the results of calculating the frequency confidence measure R(t) per identification unit interval. As is the case in the identification unit intervals T0 and T1, when the frequency confidence measure R(t) drops below a predetermined value (0.5) (here, 0.01 and 0.39), it is judged as being unreliable.

A specific procedure that uses such judgment criteria shall be described. In the case where the frequency confidence measure R(t) is greater than or equal to 0.5, the most frequent model in the identification unit interval is used as-is, and in the case where the frequency confidence measure R(t) is lower than 0.5, the frequency per model in a plurality of identification unit intervals is re-calculated and the most frequent model determined. In FIG. 19, in the first two identification unit intervals T0 and T1 in which the frequency confidence measure is low, the frequency per respective model is added, and based on the frequency information re-calculated over two intervals, the most frequent model S in the two identification unit intervals is determined. Accordingly, due to the identification results in the identification unit interval T0, the most frequent sound type obtained from the sound type frequency calculation unit 105 changes from M to S, and thus matches the actual sound results.

In such a manner, by using the frequency per model in plural identification unit intervals for areas in which the frequency confidence measure is low, accurate sound identification can be outputted even if the frequency confidence measure of the most frequent model in the identification unit interval drops due to the influence of noise and the like.

Third Embodiment

Figure 20:
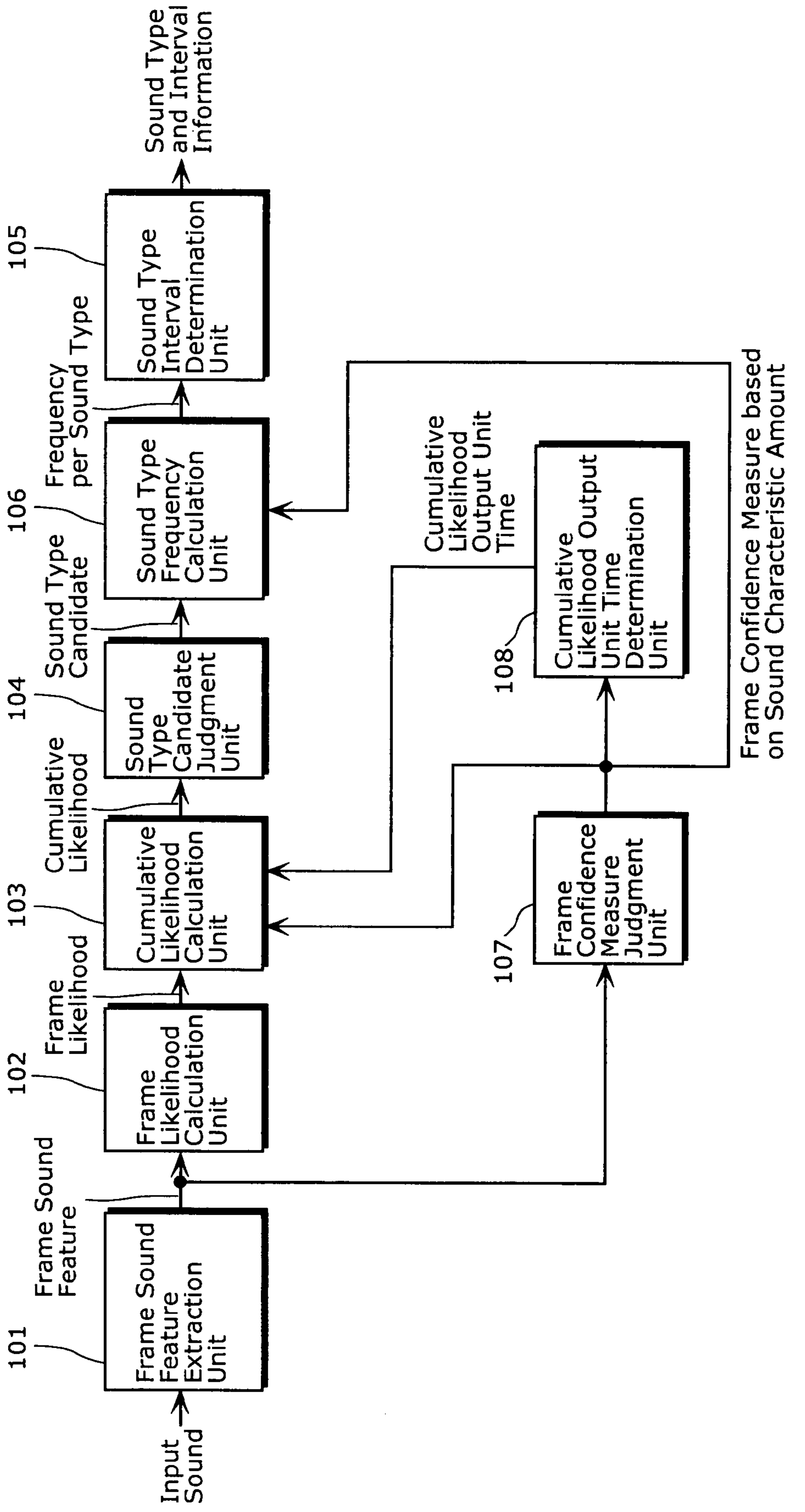
FIG. 20 is a diagram showing a configuration of a sound identification apparatus according to the third embodiment of the present invention.

FIG. 20 is a diagram showing a configuration of a sound identification apparatus according to the third embodiment of the present invention. In FIG. 20, constituent elements identical to those shown in FIG. 3 and FIG. 14 shall be given the same reference numbers, and descriptions thereof shall be omitted. In the present embodiment, a confidence measure is calculated per model of the sound feature itself using the confidence measure of the sound feature itself, and the resultant is used to calculate the frequency information. Furthermore, confidence measure information is also output as a piece of outputted information.

In FIG. 20, the frame confidence measure judgment unit 109, which performs judgment based on the sound characteristic level, outputs the sound feature confidence measure by verifying whether the sound feature is appropriate for judgment based on the sound feature calculated by the frame sound feature extraction unit 101. The cumulative likelihood output unit time determination unit 108 is configured so as to determine the cumulative likelihood output unit time based on the output of the frame confidence measure judgment unit 109. In addition, the sound type interval determination unit 105, which ultimately outputs the results, also outputs the confidence measure with the sound type and the interval.

By using such a configuration, information of intervals in which the frame confidence measure is low may be outputted together. Also, by using such a configuration, it is possible to detect the occurrence of sudden sounds by finding how much the confidence measure has changed, even when, for example, the same sounds are continuing.

Figure 21:
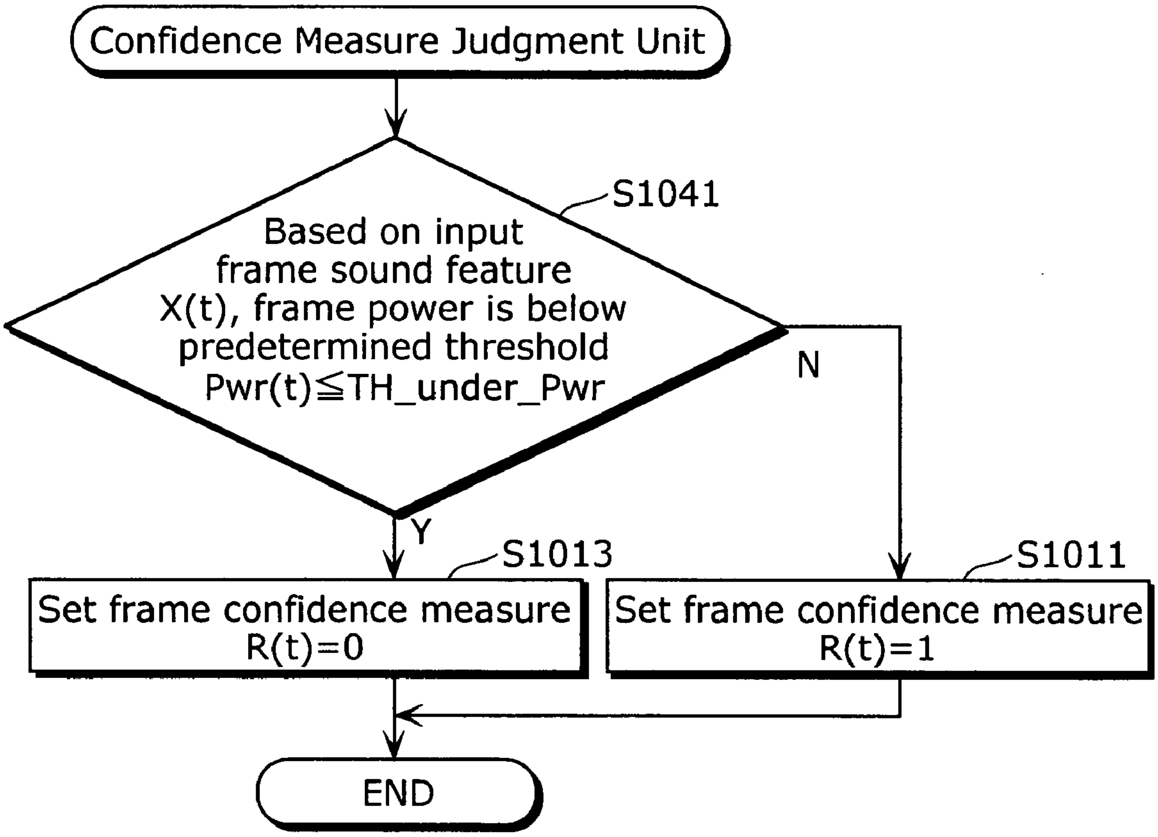
FIG. 21 is a flowchart showing processing executed by a frame confidence measure judgment unit in the first embodiment of the present invention.

FIG. 21 is a flowchart showing the calculation of the confidence measure of the sound feature based on the sound feature. In FIG. 21, constituent elements identical to those shown in FIG. 5 are given the same reference numbers, and descriptions thereof shall be omitted.

The frame confidence measure judgment unit 107 judges whether or not the power of the sound feature is below a predetermined signal power (Step S1041). In the case where the power of the sound feature is below the predetermined signal power (Y in Step S1041), the frame confidence measure based on the sound feature is assumed to have no reliability and is thus set to 0 (Y in Step S1041). In all other cases (N in Step S1041), the frame confidence measure judgment unit 107 sets the frame confidence measure to 1 (Step S1011).

By using such a configuration, it is possible to judge the type of the sound using the confidence measure at the sound input stage prior to the judgment of the sound type.

Note that regarding FIG. 20, descriptions have been given assuming the outputted reliability information is a value based on the sound feature; however, as has been described in the first and second embodiments, any one of a confidence measure based on the frame likelihood, a confidence measure based on the cumulative likelihood, and a confidence measure based on the cumulative likelihood per model may be used.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The sound identification apparatus according to the present invention has a function for judging a sound type using frequency information converted from a likelihood based on a confidence measure. Accordingly, it is possible to extract intervals of a sound from a specific category out of audio and video recorded in a real environment by learning scenes of specific categories using characteristic sounds, and possible to continuously extract exciting scenes from among content by extracting cheering sounds and using them as identification targets. In addition, it is possible to other related information using the detected sound type and interval information as tags, and utilize a tag detection device or the like for audio/visual (AV) content.

Furthermore, the present invention is useful as a sound editing apparatus or the like which detects sound intervals from a recorded source in which various unsynchronized sounds occur and plays back only those intervals.

In addition, it is possible to extract intervals in which sound changes even when the same sound type is detected, such as when sudden sounds occur over a short period of time, by outputting intervals in which the confidence measure has changed.

Furthermore, the confidence measure of the frame likelihood and so on may be outputted and used as the sound identification results, rather than just the sound identification results and that interval. For example, in the case where an area where the confidence measure is low is detected when editing a sound, a beep sound or the like may be provided as a notification of search and editing. In such a manner, it is expected that search operations will be more effective in the case where sounds that are difficult to model due to their short length, such as sounds of doors and pistols, are searched for.

Furthermore, intervals in which the outputted confidence measures, cumulative likelihoods, and the frequency information alternatively occur may be diagrammed and presented to the user. Through this, it is possible for the user to easily see intervals in which the confidence measure is low, and it can be expected that editing operations or the like will be more effective.

By equipping the sound identification apparatus according to the present invention in, it is possible to apply the present invention in a recording apparatus or the like which can compress recorded audio by selecting a necessary sound and recording the audio.

What is claimed is:

1. A sound identification apparatus that identifies the sound type of an inputted audio signal, said apparatus comprising:

a sound feature extraction unit operable to divide the inputted audio signal into a plurality of frames and extract a sound feature per frame;

a frame likelihood calculation unit operable to calculate a frame likelihood of the sound feature in each frame, for each of a plurality of sound models;

a confidence measure judgment unit operable to judge a confidence measure based on the sound feature or a value derived from the sound feature, the confidence measure being an indicator of whether or not to cumulate the frame likelihoods;

a cumulative likelihood output unit time determination unit operable to determine a cumulative likelihood output unit time so that the cumulative likelihood output unit time is shorter in the case where the confidence measure is higher than a predetermined value and longer in the case where the confidence measure is lower than the predetermined value;

a cumulative likelihood calculation unit operable to calculate a cumulative likelihood in which the frame likelihoods of the frames included in the cumulative likelihood output unit time are cumulated, for each of the plurality of sound models;

a sound type candidate judgment unit operable to determine, for each cumulative likelihood output unit time, a sound type corresponding to the sound model that has a maximum cumulative likelihood;

a sound type frequency calculation unit operable to calculate a frequency at which the sound type determined by said sound type candidate judgment unit appears in a predetermined identification time unit; and a sound type interval determination unit operable to determine the sound type of the inputted audio signal and the temporal interval of the sound type, based on the frequency of the sound type calculated by said sound type frequency calculation unit.

2. The sound identification apparatus according to claim 1, wherein said confidence measure judgment unit is operable to judge the confidence measure based on the frame likelihood of the sound feature in each frame for each sound model, calculated by said frame likelihood calculation unit.

3. The sound identification apparatus according to claim 2, wherein said confidence measure judgment unit is operable to judge the confidence measure based on an amount of which the frame likelihood changes between frames.

4. The sound identification apparatus according to claim 2, wherein said confidence measure judgment unit is operable to judge the confidence measure based on the difference between the maximum value and minimum value of the frame likelihood for the plurality of sound models.

5. The sound identification apparatus according to claim 2, wherein said cumulative likelihood calculation unit is operable to not cumulate the frame likelihood for frames having a confidence measure lower than a predetermined threshold.

6. The sound identification apparatus according to claim 1, wherein said confidence measure judgment unit is operable to judge the confidence measure based on the cumulative likelihood calculated by said cumulative likelihood calculation unit.

7. The sound identification apparatus according to claim 6, wherein said confidence measure judgment unit is operable to judge the confidence measure based on i) the number of sound models in which the cumulative likelihood is within a predetermined difference from a maximum or minimum of the cumulative likelihood of the plurality of sound models and ii) the amount of change in the cumulative likelihood.

8. The sound identification apparatus according to claim 1, wherein said confidence measure judgment unit is operable to judge the confidence measure based on the cumulative likelihood per sound model calculated by said cumulative likelihood calculation unit.

9. The sound identification apparatus according to claim 1, wherein said confidence measure judgment unit is operable to judge the confidence measure based on the sound feature extracted by said sound feature extraction unit.

10. The sound identification apparatus according to claim 1, further comprising:

an identification unit time determination unit operable to determine an identification unit time based on the confidence measure, wherein said sound type frequency calculation unit is operable to calculate the frequency of a sound type included in the identification unit time.

11. A sound identification method for identifying the sound type of an inputted audio signal, said method comprising:

dividing the inputted audio signal into a plurality of frames and extracting a sound feature per frame;

calculating a frame likelihood of the sound feature in each frame, for each of a plurality of sound models;

judging a confidence measure based on the sound feature or a value derived from the sound feature, the confidence measure being an indicator of whether or not to cumulate the frame likelihoods, determining a cumulative likelihood output unit time so that the cumulative likelihood output unit time is shorter in the case where the confidence measure is higher than a predetermined value and longer in the case where the confidence measure is lower than the predetermined value;

calculating a cumulative likelihood in which the frame likelihoods of the frames included in the cumulative likelihood output unit time is cumulated, for each of the plurality of sound models;

determining, for each cumulative likelihood output unit time, a sound type corresponding to the sound model that has a maximum cumulative likelihood;

calculating a frequency at which the sound type determined in said determining of a sound type appears in a predetermined identification time unit; and determining the sound type of the inputted audio signal and the temporal interval of the sound type, based on the frequency of the sound type calculated in said calculation of the frequency.

12. A program of a sound identification method for identifying the sound type of an inputted audio signal, said program causing a computer to execute the steps of:

dividing the inputted audio signal into a plurality of frames and extracting a sound feature per frame;

calculating a frame likelihood of the sound feature in each frame, for each of a plurality of sound models;

judging a confidence measure based on the sound feature or a value derived from the sound feature, the confidence measure being an indicator of whether or not to cumulate the frame likelihoods, determining a cumulative likelihood output unit time so that the cumulative likelihood output unit time is shorter in the case where the confidence measure is higher than a predetermined value and longer in the case where the confidence measure is lower than the predetermined value;

calculating a cumulative likelihood in which the frame likelihoods of the frames included in the cumulative likelihood output unit time is cumulated, for each of the plurality of sound models;

determining, for each cumulative likelihood output unit time, a sound type corresponding to the sound model that has a maximum cumulative likelihood;

calculating a frequency at which the sound type determined in said determining of a sound type appears in a predetermined identification time unit; and determining the sound type of the inputted audio signal and the temporal interval of the sound type, based on the frequency of the sound type calculated in said calculation of the frequency.

* * * * *